United States Patent [19]

DiGiacomo et al.

[11] 4,418,464
[45] Dec. 6, 1983

[54] WRAPPING APPARATUS FOR INDUSTRIAL BATTERY PLATES

[75] Inventors: Hector DiGiacomo, Lafayette Hill, Pa.; Robert R. Raos, Freemont, Calif.; Al L. Zabko, Solon, Ohio

[73] Assignee: General Battery Corporation, Reading, Pa.

[21] Appl. No.: 174,151

[22] Filed: Jul. 31, 1980

[51] Int. Cl.³ .............. B23P 19/04; H01M 2/14
[52] U.S. Cl. .................... 29/564.6; 29/564.1; 29/730; 53/234
[58] Field of Search .............. 29/564.1, 564.6, 564.7, 29/564.8, 730, 731, 563; 53/234

[56] References Cited

U.S. PATENT DOCUMENTS

| 2,324,523 | 7/1943 | Lund | 29/730 |
|---|---|---|---|
| 2,373,082 | 4/1945 | Staelin | 154/41 |
| 2,624,106 | 1/1953 | Lund | 29/204 |
| 2,853,839 | 10/1958 | Herrmann | 53/32 |
| 3,011,935 | 12/1961 | Bodek et al. | 53/234 X |
| 3,364,551 | 1/1968 | Napor et al. | 29/564.1 X |
| 3,570,099 | 3/1971 | Ackerman et al. | 29/564.1 |
| 3,738,898 | 6/1973 | Lowe et al. | 156/498 |
| 3,744,112 | 7/1973 | Lindenberg et al. | 29/564.1 X |
| 3,781,962 | 1/1974 | Norris et al. | 29/564.7 X |
| 3,799,321 | 3/1974 | Agui | 198/35 |
| 3,892,620 | 7/1975 | Heussy | 156/443 |
| 3,900,341 | 8/1975 | Shoichiro et al. | 136/54 |
| 3,989,579 | 11/1976 | Sheldon | 29/730 X |
| 4,026,000 | 5/1977 | Anderson | 29/730 |
| 4,069,079 | 1/1978 | Eggert | 156/212 |
| 4,080,727 | 3/1978 | Stolle | 29/730 X |
| 4,080,732 | 3/1978 | Eberle | 29/730 |
| 4,216,579 | 8/1980 | Murata et al. | 29/730 |
| 4,263,712 | 4/1981 | Schroder | 29/730 X |

FOREIGN PATENT DOCUMENTS

| 461468 | 4/1975 | U.S.S.R. | 29/730 |
|---|---|---|---|
| 636718 | 12/1978 | U.S.S.R. | 29/730 |

Primary Examiner—William R. Briggs
Attorney, Agent, or Firm—Benasutti & Murray

[57] ABSTRACT

An apparatus for automatically wrapping a plate for use in a lead acid industrial storage battery, said wrapping comprising a combination of three acid resistant, flexible porous materials forming an envelope adapted to insulate said plate while allowing free access of the battery acid to the surfaces of said plate. As configured, the wrapping apparatus comprises a plurality of regularly spaced, heated die fixtures attached to a servo controlled turntable, said turntable acting to index said dies through a set of six fixed work stations which are disposed on said apparatus around the periphery of said turntable. The six work stations of the apparatus are adpated to feed each of the three wrapping materials and a plate into one of said dies, wrap the materials around the plate, seal the edges of the outermost of said three wrapping materials, discharge the wrapped plate for further processing and measure the temperature of the heated die before it is recycled through the apparatus. In the present configuration, the apparatus is adapted to produce a wrapped plate, every six to eight seconds.

41 Claims, 29 Drawing Figures

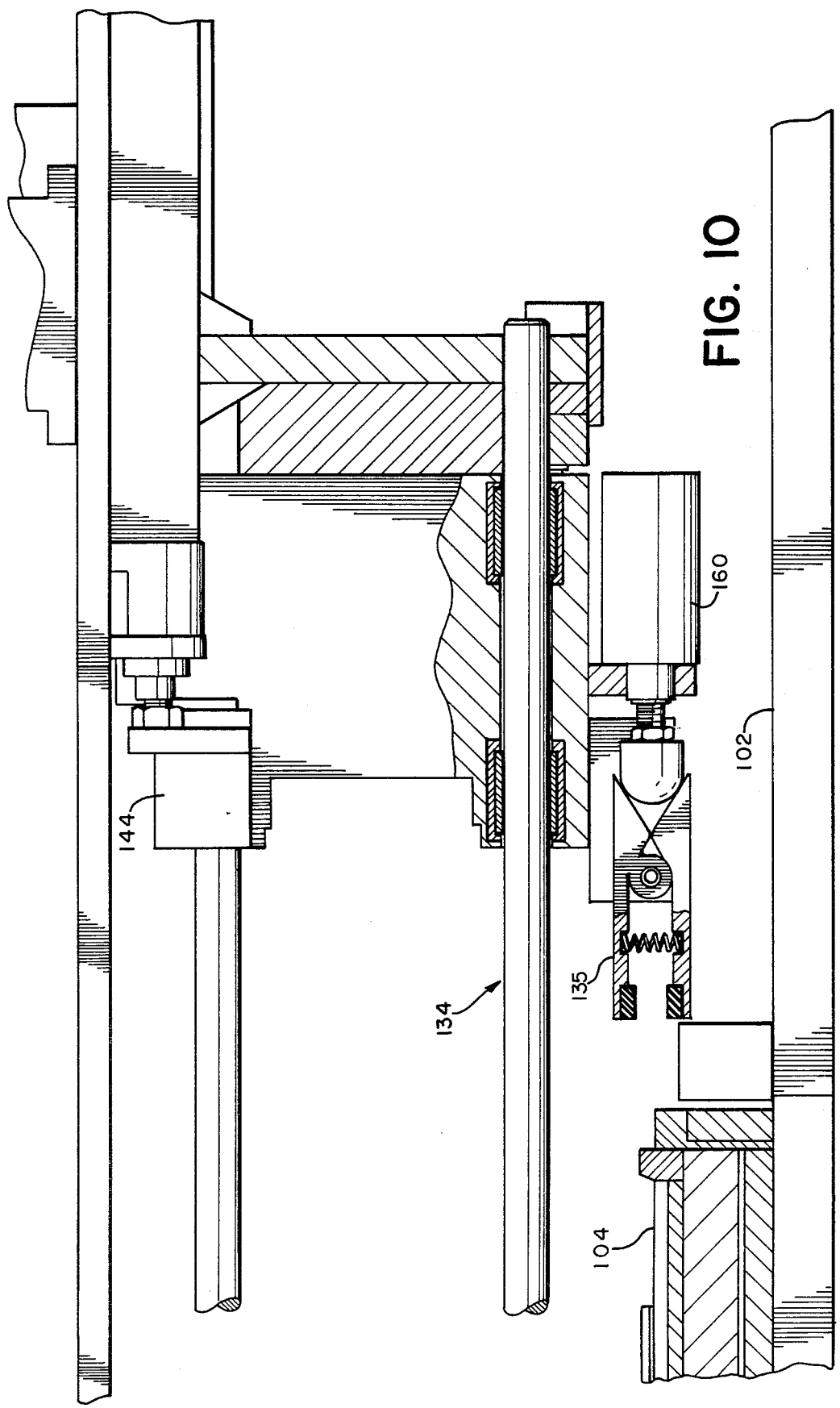

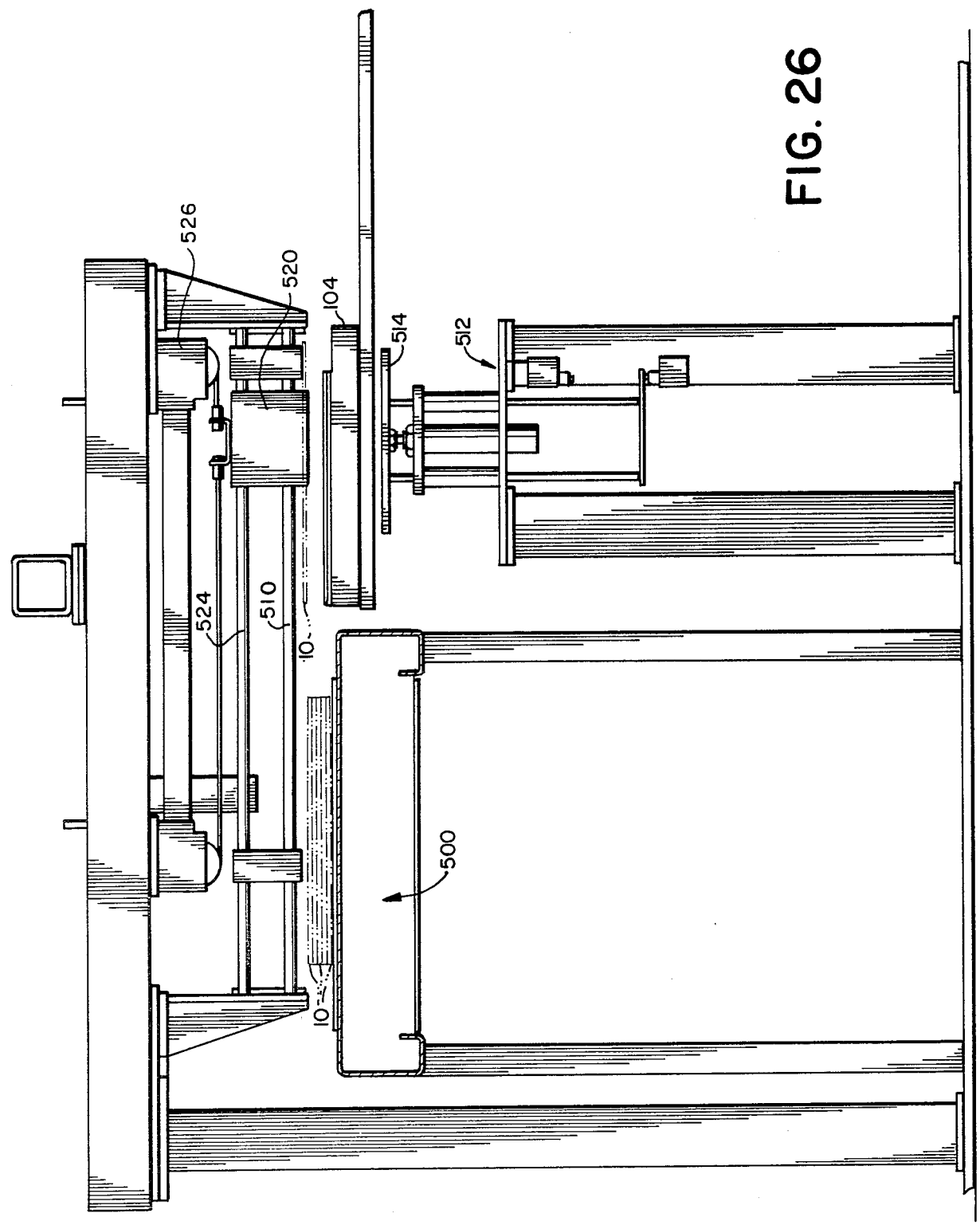

WRAPPING APPARATUS FOR INDUSTRIAL BATTERY PLATES

BACKGROUND OF THE INVENTION

The present invention relates to equipment for use in the production of lead acid storage batteries and in particular to automated industrial battery production equipment for wrapping the plates used in the assembly of large industrial batteries.

The construction of a lead acid storage battery is generally accomplished by the series assembly of a plurality of discrete cells formed within a battery case, each cell having a nominal voltage, when charged, of about 2.0 volts. Each of these cells is constructed by combining a plurality of alternately arranged rectangular, relatively thin, positive and negative plates to form an element. As fabricated, each of the plates is in the form of a grid, having a plurality of cavities, each being filled with a dried relatively fragile "paste" of lead oxide and sulfuric acid. Each plate also has an upstanding, connecting lug along one of its edges which is disposed so that all of the positive plate lugs lie along one side of the element and all of the negative plate lugs lie along its opposite side. In all applications, the element is finished by inserting insulating separators between and underneath the positive and negative plates to prevent them from shorting out after a subsequent charging step.

Since the advent of the storage battery industry, virtually hundreds of different materials have been suggested for use as separator material. For many years, wood was the material of choice, after which various paper materials received widespread acceptance. Most recently, a number of synthetic materials have been utilized, due in large part to their superior insulating and tear resistance characteristics. However, in most industrial battery applications, the normal practice is to wrap the positive plates with several layers of acid resistant porous material. This is both to retain any loose fragments of lead oxide paste which might tend to break off as a result the often severe physical shocks encountered while in use as well as to electrically insulate the plate as hereinabove described. At present, these insulating, protective layers are manually applied to these plates. Because industrial battery plates can be quite large, this method can be both time-consuming and physically enervating for the people who do the work. Furthermore, the continuing necessity of using manual labor for such operations is both expensive and inefficient. There is, therefore, a genuine need for automated equipment which can quickly, thoroughly and economically perform the plate wrapping operation hereinbove described.

SUMMARY OF THE INVENTION

It is the principal object of the present invention, in light of the above-mentioned needs for a modern, improved method of wrapping industrial battery plates to provide an apparatus which will do so quickly and economically.

A further object of this invention is to provide an automatic wrapping apparatus which is easily adapted to receive and process a wide variety of plates with a minimum of effort.

These and other objects are achieved in the present invention by providing an apparatus containing a plurality of work stations adapted to receive a series of individual plates of a first of said stations and, while transporting them one at a time through the apparatus, apply to them, in order, a series of wrappings.

For the batteries of interest, three such wrappings are applied. The innermost of these is made from a porous composite strip known as Retent-A-Tape, which is placed in a lengthwise oriented aspect on the front and back sides of the plate and around its lower end. As applied, this is held in place by a small plastic boot which fits over the lower end of the plate and acts to both clamp the Retent-A-Tape in place and insulate the bottom of the plate from the surrounding medium. The next, intermediate wrapped layer is a fiberglass matting which is sideways wrapped around the front, back and the left and right sides of the plate. The outermost layer is made up of a pierced plastic, such as Koroseal or a similar polymeric elastomer. As received, all three of these materials come in large rolls and the apparatus is adapted to accept, draw and cut pre-set swatches of material from them according to the length of the plate being wrapped, apply these in order to a plate, bond the outer layer of the assembly and discharge the wrapped plate for further processing.

To do all this, the apparatus described herein comprises a plurality of operating stations having the following sequence of operations:

Station 1—Koroseal and glass mat strips are automatically fed from rolls into the machine, and horizontally disposed pre-set swatches are cut therefrom. The cut lengths are placed into a heated fixture or die, having a central cavity more or less the same size as the plate which will be wrapped therein, and clamped in place to form a set of layers with the Koroseal on the bottom and the glass mat on the top.

Station 2—An unwrapped plate is fed in so that its leading edge intercepts the center portion of a vertically disposed pre-cut swatch of Retent-A-Tape and carries it into the apparatus. The center portion of the Retent-A-Tape is clamped into place with an elastomeric, preferably polyvinyl, boot which is automatically fitted over the leading edge of the advancing plate. At the end of its inward travel the plate is dropped into the die where it is set onto the pre-heated Koroseal and glass mat layers therein. A tight fit is achieved by tamping the plate into the die.

Station 3—The middle and outer layers are folded around the upper surface of the plate within the die, and the overlapping surfaces of the outer Koroseal layer are bonded to form a continuous outer wrapping layer.

Station 4—The bottom edge of the Koroseal layer is bonded to the boot to complete the wrapping operation.

Station 5—The wrapped and sealed plate is discharged onto to an exit conveyor

Station 6—The temperature of the now empty but still heated die is monitored to check on the operation of the system. If the die is found to be either too hot or too cool, a system malfunction is indicated and the machine is programmed to shut down until the cause of such malfunction is found and corrected.

A system of sensing devices is also provided within this apparatus to provide inputs to a timing and control system which in turn activates or stops, as the case may be, the various steps in the wrapping process. This apparatus is further designed to be incorporated into an entire cell stacking or battery forming process which might include a plurality of battery forming operations. In such an event, the control of all stations could be interrelated so that a breakdown or stoppage at one station is relayed to the other stations so that their functions may be stopped or altered accordingly.

The above-mentioned and further objects of the present invention will be more fully understood from the following detailed description taken in conjunction with the formal drawings.

BRIEF DESCRIPTION OF THE DRAWINGS

FIG. 10 is an enlarged detail of the gripper means used in conjunction with the feeding subsystem as shown in FIG. 5.

FIG. 26 is a side view of the plate unloading and conveyor system at Work Station 5

DETAILED DESCRIPTION OF THE INVENTION

Figure 1:
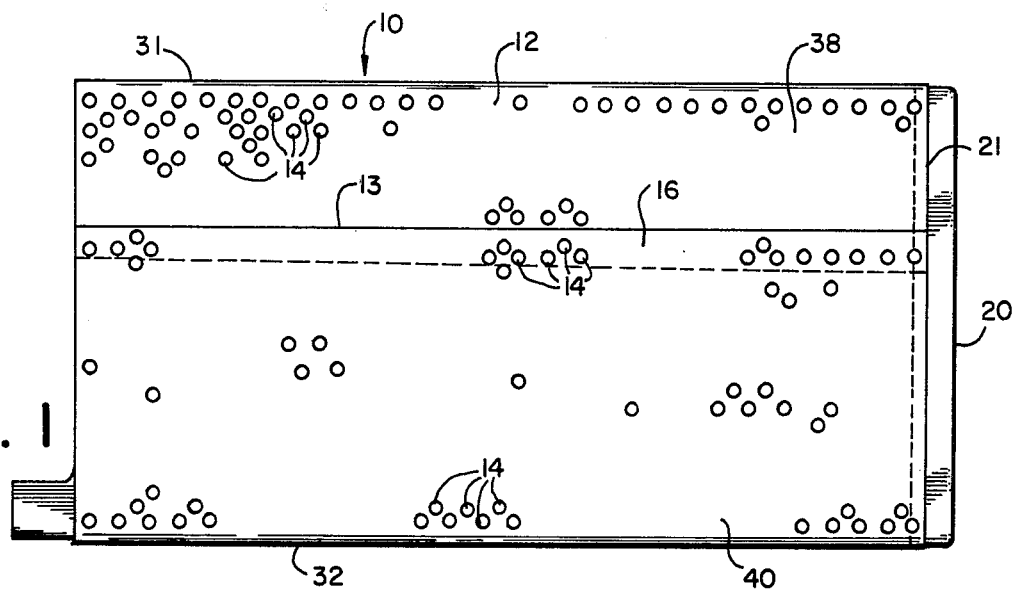
FIG. 1 is a plan view of a wrapped battery plate.
Figure 2:
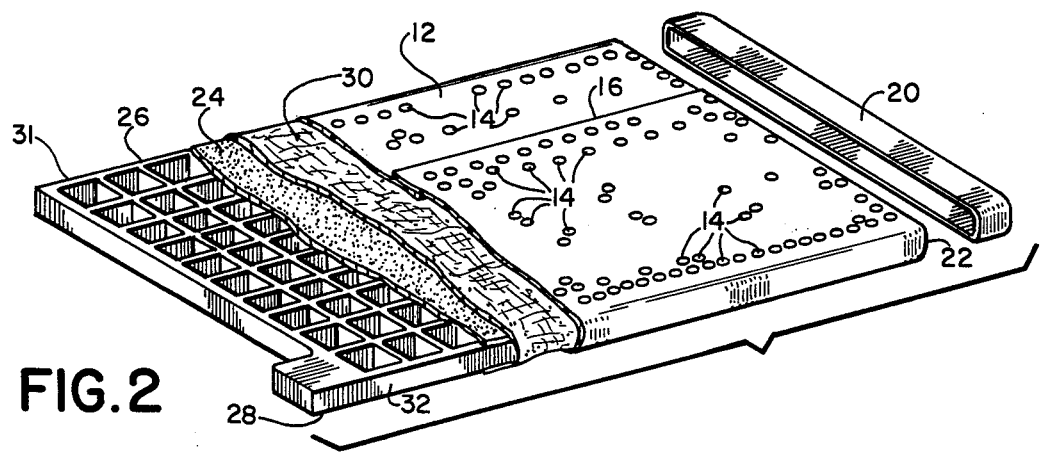
FIG. 2 is an exploded isometric view of the plate of FIG. 1 showing the internal wrappings and boot.

Referring now to FIGS. 1 and 2, we see a positive battery plate 10 in the final wrapped condition showing an outer plastic cover 12, said cover having a plurality of holes 14 therein to facilitate the flow of battery acid therethrough to make contact with the plate. The lengthwise seam 13 of cover 12 is sealed along its length by a heat seal 16 and bonded at its lower edge 18 to a plastic, preferably polyvinyl, boot 20 which fits over the bottom end 22 of plate 10.

The complete sequence of wrappings is shown in FIG. 2. This shows an inner layer 24 of Retent-A-Tape, which fits over the front surface 26, back surface 28 and around bottom end 22 of plate 10. As fabricated, Retent-A-Tape is a continuous strip of flexible, randomly oriented, acid resistant chopped fiberglass mating, one side of which has a plurality of parallel uniaxial continuous filament wound fiberglass rovings, closely spaced one beside the other across the width of the mat and running along its length. As applied, the roving side of the Retent-A-Tape is the side which is in physical contact with the surfaces of plate 10 in its finish wrapped condition.

On the outer side of the layer 24 is an intermediate proous layer 30, which is also a flexible, randomly oriented mat of chopped fiberglass fibers. This mat is structurally similar to that used as the base for the Retent-A-Tape, but is of a heavier, thicker gage and serves to provide further reinforcement to the Retent-A-Tape layer in the service environment of the battery. Layer 30 is wrapped sideways around the plate and covers top surface 26, bottom surface 28 and left and right sides 31 and 32 of plate 10. While there is, as applied, somewhat of an overlap, the edges of layer 30 are not sealed or bonded together.

Figure 3:
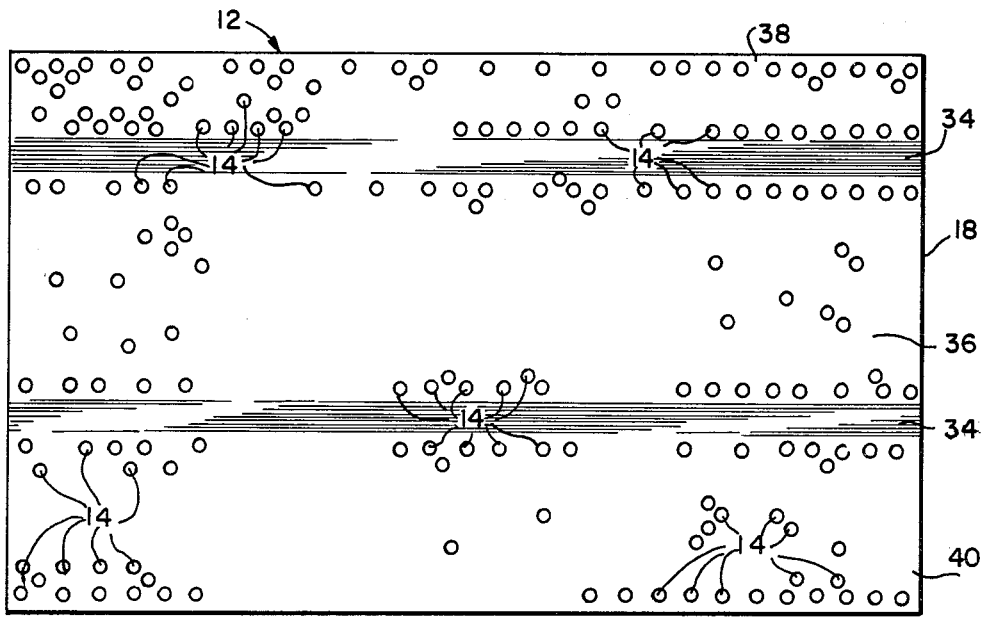
FIG. 3 is a plan view of an unwrapped, cut outer cover.

The outermost layer on plate 10 is cover 12, which currently comprises a thin polymeric thermoplastic elastomeric sheet of a type known as Koroseal, and in the subject invention, is applied simultaneously with intermediate layer 30. As shown in FIG. 3, cover 12 is not only perforated with a plurality of holes 14, but also includes a pair of unperforated longitudinal stripes 34 which fit over sides 31 and 32. The stripes are not perforated so as to provide electrical insulation of edges 31 and 32, and as shown, they are asymetrically placed within cover 12. This serves to divide the cover into three separate and unequal strips; a center strip 36 which is slightly less than the unwrapped width of plate 10 and which, in the wrapping procedure, will cover plate bottom surface 28 and a pair of narrow and wide side strips 38 and 40, respectively, which are designed to provide the overlap needed to form heat seal 16 over plate top surface 26 in the manner described hereinabove. This, when combined with the aforementioned bonding of the lower edge with boot 20, acts to create a closely-fitted envelope around the sides, bottom and front and back surfaces of the plate which envelope is designed to fully contain the intermediate wrapping layers and to prevent any loose fragments of the relatively brittle, dried lead oxide/sulfuric acid paste, which may have broken loose from within the plate/grid structure, from falling out of position, while allowing free access of the battery acid electrolyte in service.

With this understanding of the product of the subject invention, let us now proceed to a detailed discussion of a preferred embodiment of an apparatus for producing it, and the method by which the three wrappings are applied to a positive battery plate.

Figure 4:
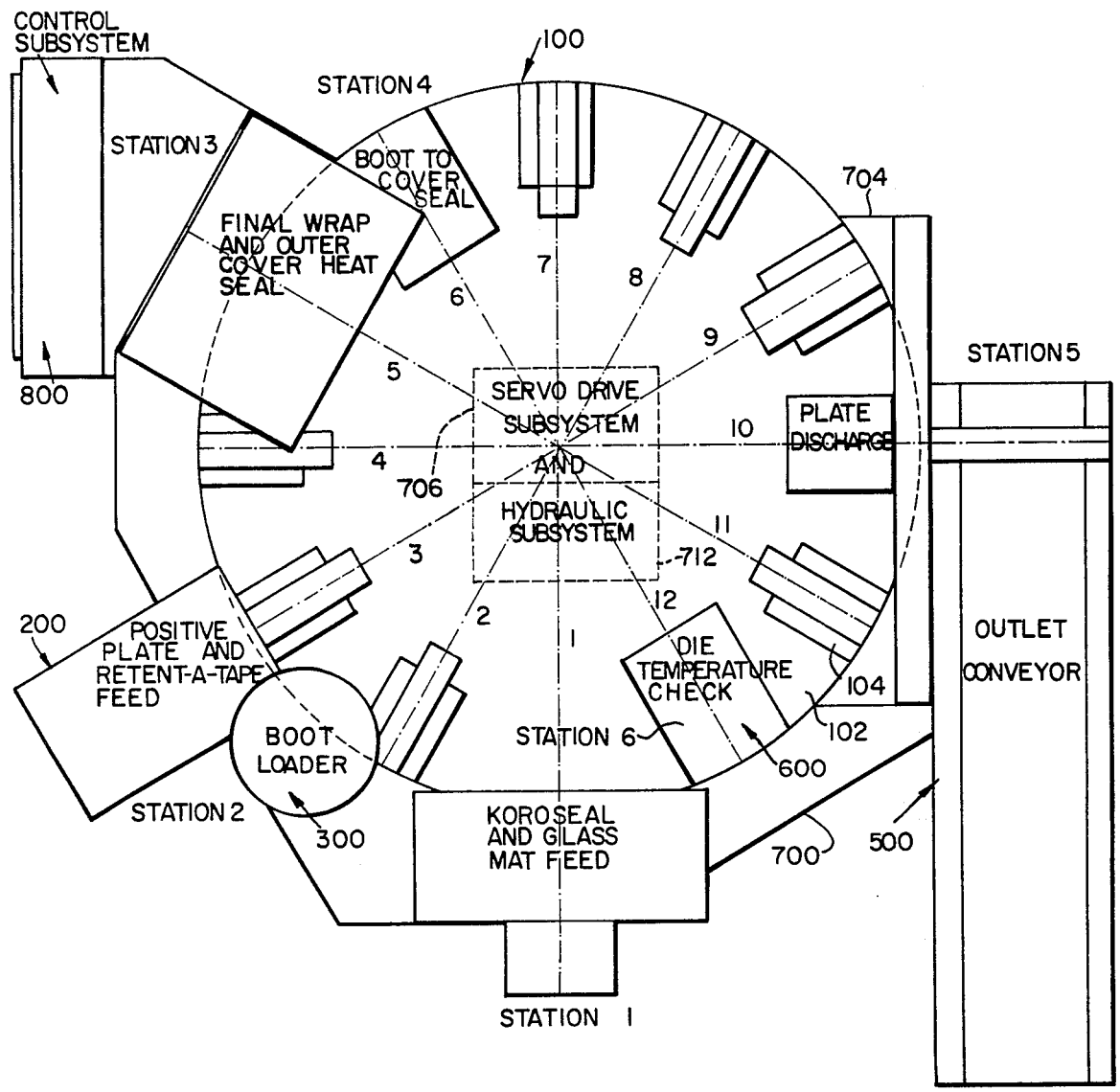
FIG. 4 is an overall view and block diagram of a positive plate wrapping system as disclosed herein.

Referring now to FIG. 4, a top view of the preferred embodiment of an automatic plate enveloping machine, designated generally 100 is illustrated. As shown, the apparatus is basically circular in design, although other equipment arrangements can also be used to perform the various wrapping and sealing functions. The apparatus generally comprises a base, designated 700, and a plurality of support legs 702 which combine to form a frame 704 within or upon which all of the operating equipment is set.

Set on top of frame 704 is a horizontally disposed, rotatable turntable 102. This is adapted to turn in a stepwise fashion within the apparatus 100, said motion being controlled by a servo subsystem 706, which is supported within the structure of frame 704 and operably connected to turntable 102. Also associated with apparatus 100 is a regulated air supply 710 which supplies process control air to the various pneumatically actuated feed and process subsystems which will be described in detail hereinbelow and a hydraulic subsystem 712 for Koroseal/glass mat feed control.

All of these subsystems, as well as their operating functions, are actuated by a control subsystem providing a preselected cycle, or program, and designated generally as 800, wherein the basic system timing is established. Control system 800 is also adapted to monitor the various processing operations so that if any of them experience a malfunction, the system can be stopped before excessive scrap losses occur.

Turntable 102 has, as shown, a set of twelve radially disposed work positions designated 1 through 12, evenly spaced around its outer periphery. Also located around apparatus 100 are six Work Stations, designated 1, 2, 3, 4, 5, and 6 which in the embodiment shown are located at turntable positions 1, 2, 3, 5, 6, 10 and 12. This particular arrangement allows adequate room for each major processing component to be conveniently sited while keeping the whole apparatus reasonably compact. Located just within the outer periphery of turntable 102 and carried by it at each of its work positions is a set of twelve radially disposed, hollow, heated fixtures or dies 104. These are circumferentially spaced so that when any one of them is aligned with Position 1, one will also appear at each of the remaining eleven turntable positions. The system timing and stepwise rotation set up by program subsystem 800 and servo system 706 makes it possible to operate the equipment with a plate in all twelve of the dies and, in operation, the apparatus is designed to produce a finished, wrapped plate every six to eight seconds.

Looking in some detail at the six Work Stations shown in FIG. 4, it is seen that Station 1 at turntable position 1 comprises a pair of roll feed subsystems 106 and 108 which supply the Koroseal and glass mat materials for the outer and middle wrapped layers of the plate. Station 1 further comprises hydraulically actuated gripper means 134 which engages the wrapping materials to draw preselected lengths into a processing position over the particular die which is located in the Station at that time. Each die is internally heated to a temperature of 170°–200° for ease of processing. The material length chosen is set up within control subsystem 800 as a function of the plate length, and is cut off from the rolls by cutting means 132. When cut off, the material lengths are clamped within and are carried by the die as the turntable rotates through the apparatus.

The next Work Station located on the outer periphery of turntable 102 begins at position 2. This is turret boot loader 300, which supplies boots 20 and operates in conjunction with plate loader subsystem 250, Retent-A-Tape feed subsystem 200, and the plate tamping subsystem 350; all located at turntable position 3 to form Work Station 2.

Plate loader subsystem 250 itself comprises shuttle plate feeder means 258 which is adapted to introduce plates into Station 2, one at a time. In so doing, the plates make contact with the midpoint of a vertically disposed swatch of Retent-A-Tape which had previously been pulled up to a position in front of loader 250 from Retent-A-Tape roll feed subsystem 200 and advance with the swatch to a die sited at turntable position 3.

Boot loader 300 inserts a boot into the plate path so that it will contact the advancing forwardly facing, Retent-A-Tape covered edge 22 of the plate and fit over said edge to clamp and lock the Retent-A-Tape in place as its upper and lower portions are draped around the front and back plate surfaces 26 and 28. The plate is then carried into the interior of Work Station 2, where it is deposited and tamped into the hollow portion 146 of a waiting die by tamping means 250. At this time, the back surface 26 of plate 10 is now covered by all three layers of wrapping material as the plate advances for further processing.

Continued stepwise rotation of turntable 102 brings the now completely filled die to Work Station 3, at turntable position 5. Here, the middle and outermost layers of Koroseal and glass mat wrapping material are first folded over the front side of plate 10 by folding means 400. The overlapping edges of Koroseal can then form seal 16, by being bonded by heat seal means 440 at a temperature of about 350° F. to complete the basic plate wrapping sequence as shown in FIG. 2.

Further stepwise rotation of turntable 102 brings the now fully wrapped plate to Work Station 4, at turntable position 6, where the wrapping operations are completed. Here, auxiliary heat seal means 480 bonds a boot 20 to outer Koroseal cover 12 along seal 21. This fairly short bond is provided by a single element heating means 482 and which act primarily to hold the boot in place and keep it from combing off during subsequent handling.

Work Station 5, at turntable position 10, comprises conveyor means 500 onto which the finished, wrapped plate 10 is discharged from its die, by pusher means 510, and gripper means 520 which carries the plate out of the system for further processing. In the embodiment described herein, conveyor means 500 is programmed to accumulate a stack of five plates before it begins to carry the stack out of the system.

Work Station 6, located at turntable position 12, comprises external temperature monitor means 600 which are adapted to evaluate the temperatures of the dies before they are rotated back to position 1 for reuse. Inasmuch as the system is a high-speed system, the temperature of the dies will generally fall to between 170° and 200° F. once equilibrium operation is reached. Should the temperature observed in any one die be above or below these levels, a system malfunction is indicated which, if not corrected, could lead to the rapid generation of a large quantity of discrepant plates which must either be reworked or scrapped. Temperature monitor means 600 is adapted to cooperate with programmable control means 800 so that the occurrence of such a condition will quickly stop the operation of the machine for necessary repairs.

Because of the nature of the process, it is most convenient to discuss the several wrapping and fabrication steps individually. As a result, the remainder of this discussion will be an individual detailed description of the six operational Work Stations and the system which ties them all together.

STATION 1—KOROSEAL AND FIBERGLASS CUTTING AND DIE LOADING

Figure 5:
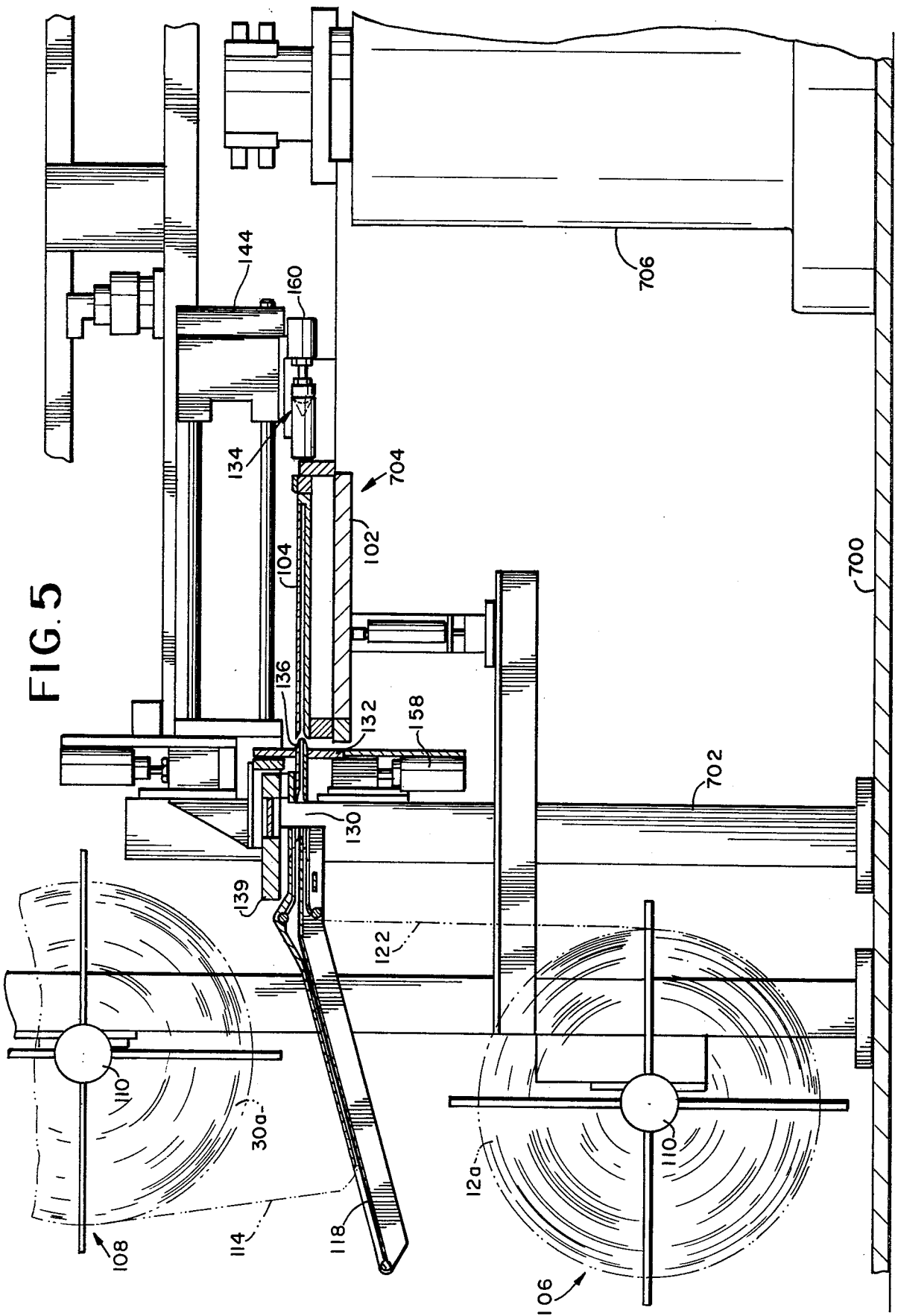
FIG. 5 is a side view of Work Station 1 in the plate wrapping station of FIG. 4.
Figure 6:
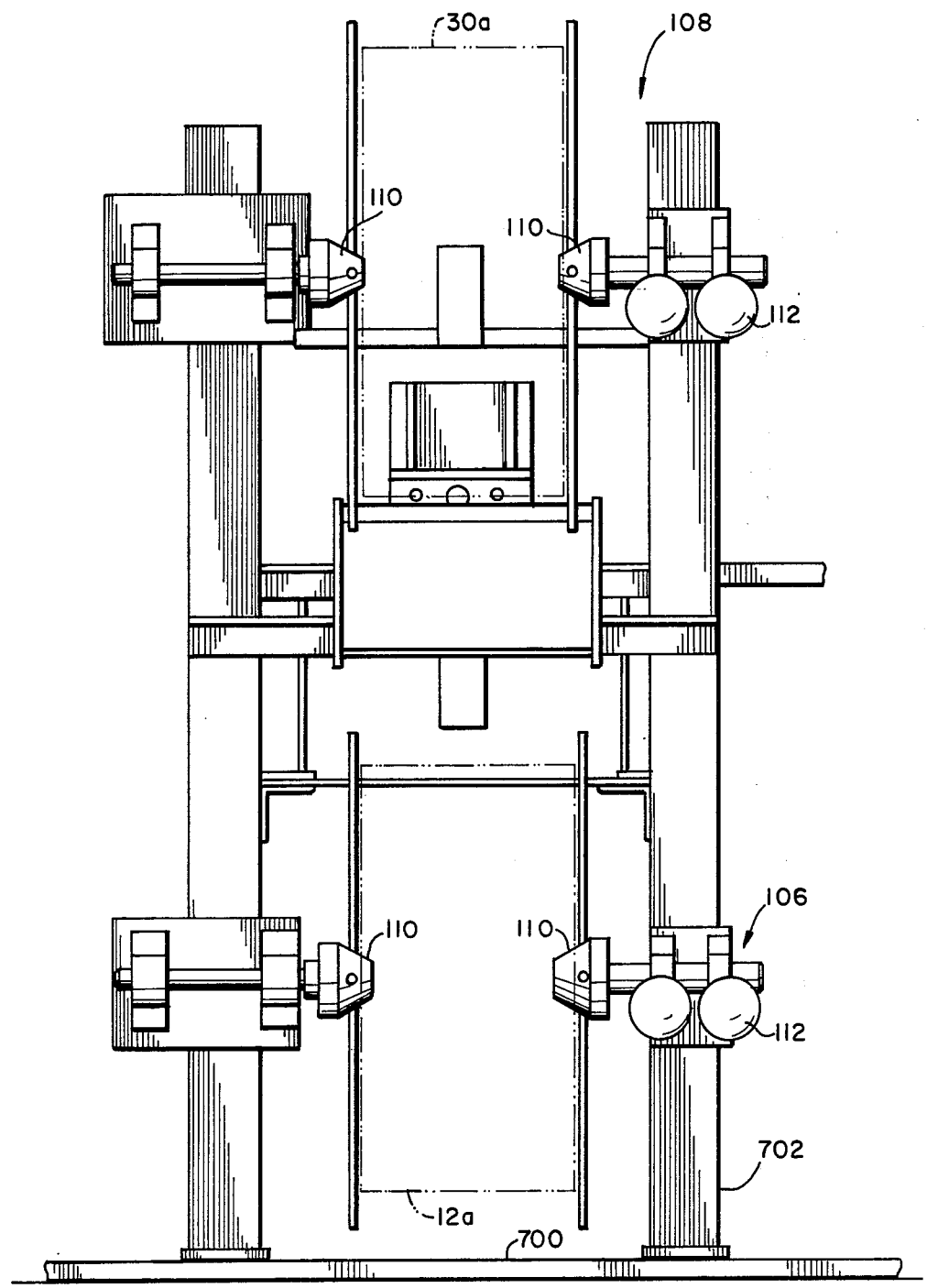
FIG. 6 is an end view of Work Station 1 as shown in FIG. 5.

Referring now to FIGS. 5 and 10, several views are provided of Work Station 1. At Work Station 1, individual lengths of Koroseal 12 and fiberglass mat 30 are set up, cut off and fed into the machine to start the wrapping process. These materials are supplied from individual continuous rolls 12a and 30a which, in the preferred embodiment design, have a maximum diameter of 24 inches. As shown in FIGS. 5 and 6, these rolls are fitted onto a pair of outboard roll-feed subsystems 106 and 108 which are vertically disposed relative to each other, with that for fiberglass 30a being topmost. This establishes the correct layer order within die 104. In this embodiment the nominal working width of Koroseal roll 12a is 12.312±0.031 inches. and that of the glass mat roll 30a is 11.875±0.031 inches. This provides enough material to be wrapped fully around the plate. For most applications, these settings can be held constant because the normal variable in the industrial battery plates of interest herein is length and not width.

Each of the roll feed subsystems comprises a pair of rotatable, free running, horizontal hubs 110 which allow the rotation of the rolls and, therefore, the easy peeling of a continuous strip of material off of each roll. These hubs are vertically positioned by adjustable supports 112 which are adapted to generate a slight frictional resistance to hub rotation. This provides a sufficient offset to the angular momentum imparted to the relatively heavy rolls by the feeding operation so that they will not continue to turn once the pulling force of the feeding operation has stopped. Thus, little, if any, slack material is formed and precise swatch cut off is assured.

Figure 7:
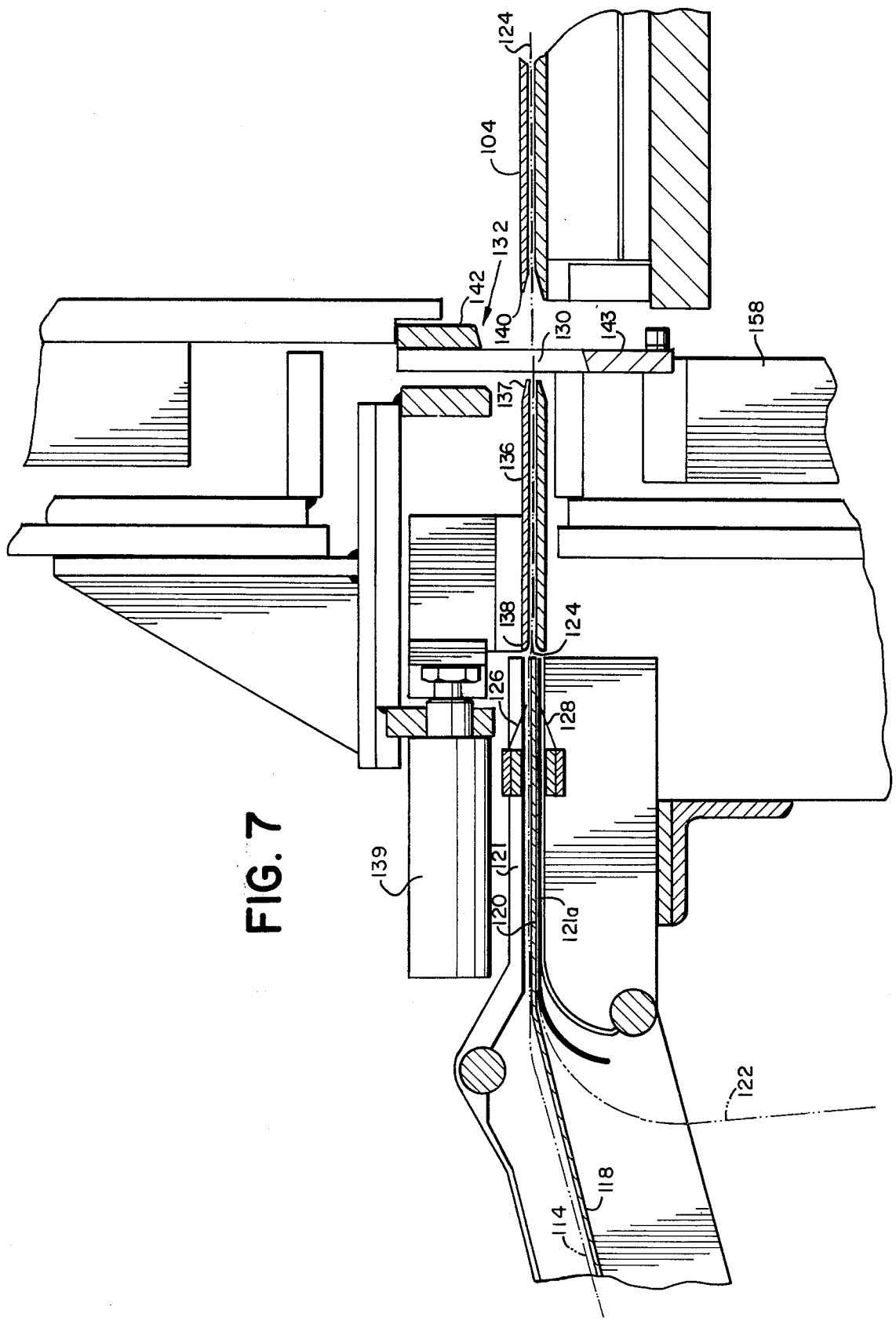
FIG. 7 is an enlarged detail of the outer cover and glass mat feed subsystems as used in Work Station 1 as shown in FIG. 5.

As shown in FIG. 7, when upper glass mat strip 114 comes off of roll 30a it falls onto the top surface of upwardly angled guide chute 118, which leads into and becomes the center portion of horizontally disposed threading plate 120, so as to form a set of stacked channels 121 and 121a within said threading plate. Lower Koroseal strip 122, which comes off of roll 12a, is simultaneously fed upwardly onto the underside of guide chute 118 and into the lowermost of the channels denoted 121a. Wrinkling, loss of tension and other feed problems are prevented by the design of guide chute 118, through which the strips of Koroseal and glass mat pass. To this end guide chute 118 has lightly spring loaded upper and lower clamps 126 and 128 located approximately midway down its length on the outermost sides of the traveling strips. The spring loading is set to keep the two strips firmly positioned against their respective guide chute surfaces within the channels 121, and 121a but is not so great as to provide an excessive resistance to free travel while they are moving toward cutoff. The traveling strips exit from threading plate 120 at which point they are mated to form strip pair 124.

After crossing vertical cutting gap 130 wherein cutting means 132 is located, mated strip pair 124 proceeds over one of the dies 104, which had simultaneously been rotated into the station, and into which it will be loaded.

This movement is caused by hydraulically actuated, radially directly, reciprocating programmable gripper means 134 which is mounted on frame 704 and adapted to advance outwardly from within the interior of Station 1 to grasp a free end of pair 124 and pull it into Station 1. Such a free end is created by the operation of cutting means 132. The relative time in the operating cycle at which cutoff occurs depends on the length of the particular series of plates being wrapped which, as noted bove, is the principal variable in plate design and is a function of the ampere/hour capacity of the finished battery. In present designs, plate length will range from about 9.625 to 16.875 inches in length. It is the programming of the gripper means which by control means 800 accommodates this variation. In operation, the length of the swatch to be cut from pair 124 is preset at the start of operation of apparatus 100. Once gripper means 134 grasps the free end of strip 124 it proceeds inwardly back into the station until the preprogrammed length has been paid out under cut off means 132. At this time, it stops long enough for cut off means 132 to be actuated and cut the grasped swatch free from strip 124. Regardless of what length has been cut off, gripper means 134 is then reactivated to pull the swatch fully back to the innermost end of die 104 before it is released. Hydraulic, rather than pneumatic, actuation means are used for this operation since these systems lend themselves much better to the precise stopping and restarting required for accurate swatch cut off.

Figure 8:
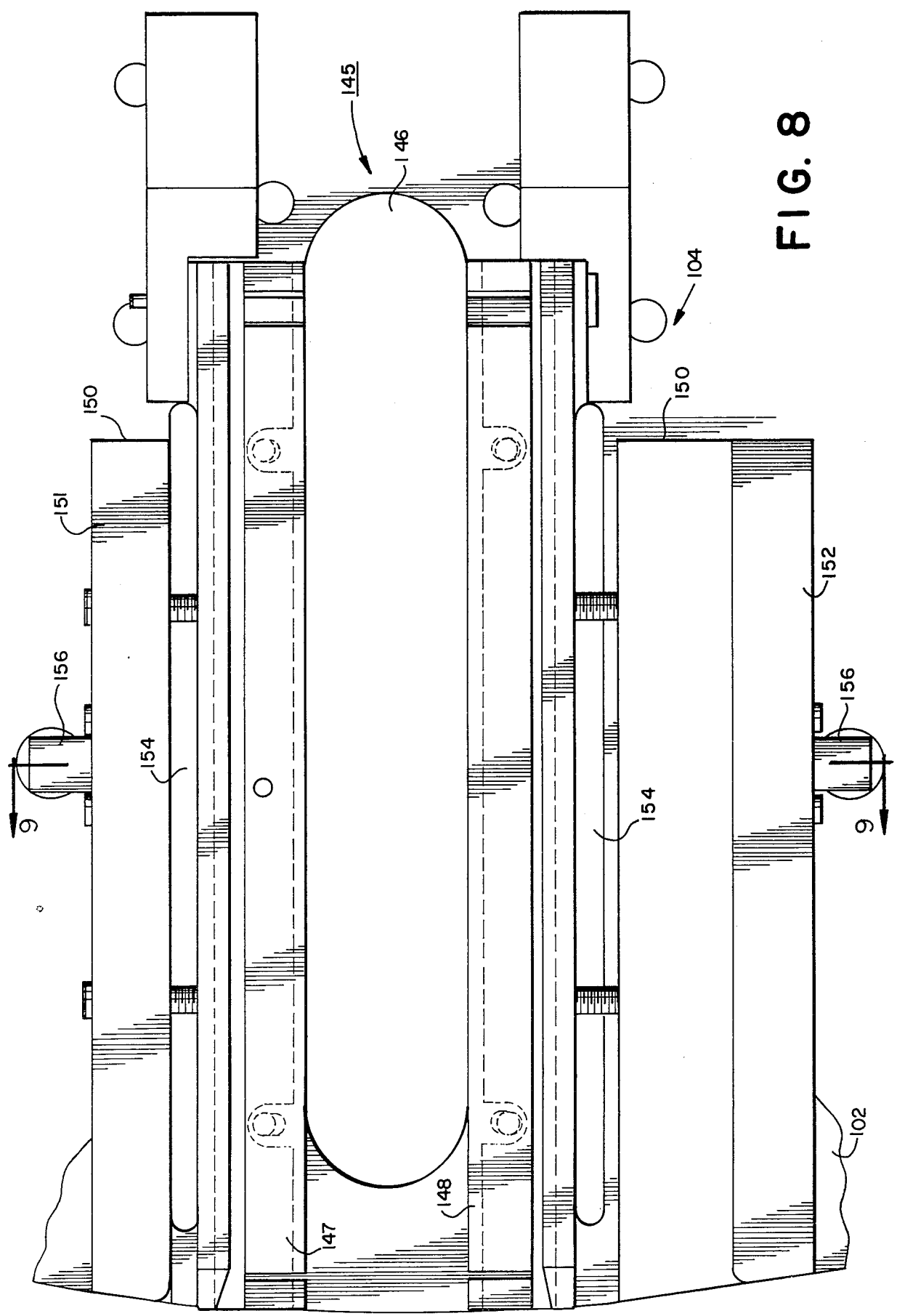
FIG. 8 is a plan view of a die used to hold a plate and its associated wrapping materials for processing within the apparatus shown in FIG. 4.
Figure 9:
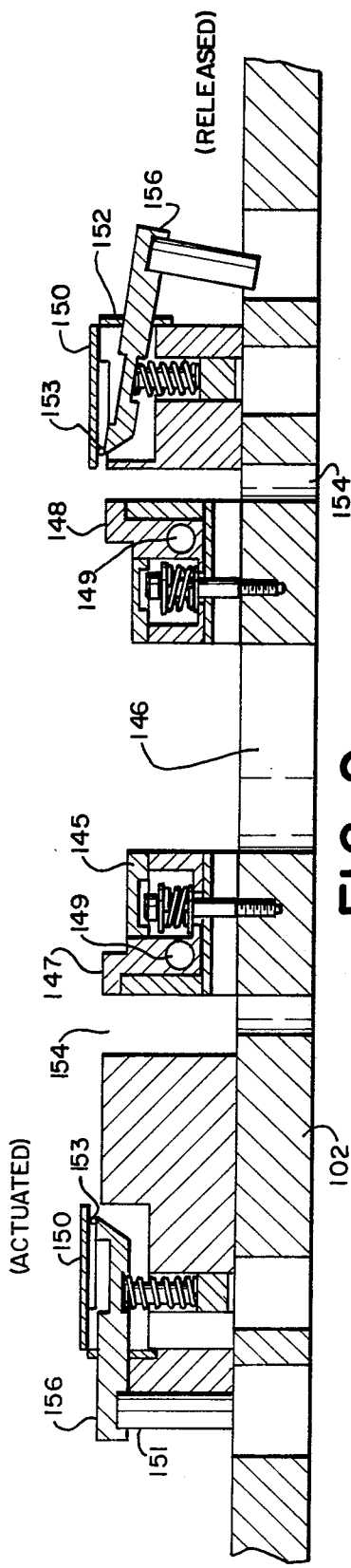
FIG. 9 is a cross-section of the die shown in FIG. 8 along the lines 9—9.

As shown in FIGS. 8 and 9, die 104 itself is a hollow fixture comprising an off-center portion 145 which is rectangular in shape and into which the plate being wrapped is deposited. This hollow portion is located over a more or less rectangular cut-out 146 in turntable 102, the purpose for which will be explained hereinbelow. At least one of the left and right sides 147 and 148 of portion 145 is spring loaded so as to be slightly adjustable to accommodate somewhat wider than nominal plates therein and both sides are heated by internal heating means 149 to a temperature in the range of 170° to 200° F., so that the Koroseal cover will conform itself to the plate and plate wrappings contained within the finished cover. The sides 147 and 148 are positioned within the die 104 so that the unperforated strips 34 of cover 12 will lie over them with the cover center portion 36 lying over hollow portion 145. Outer strips 38 and 40 of cover 12 are held flat within die 104, and are retained therein by a parallel set of guide bars 150 located at the extreme left and right sides 151 and 152, respectively, of die 104. These are elevated so as to form a pair of longitudinally disposed, horizontal slots 153 lying between the guide bars and the topmost surfaces of sides 151 and 152, one on either side of the die.

Located within these slots is a pair of biased closed, spring-loaded clamps 156. When actuated, these open to allow the traveling strip pair 124 to pass cleanly through the slots to the innermost end of die 104, at which point it is released by gripper means 134. Lastly, die 104 comprises a pair of transverse vertically disposed slots 154, one on either side of hollow member 145, which are used in conjunction with the final fold-over and sealing procedure described under Work Station 3 hereinbelow.

Proper cutoff of strip pair 124 for plate wrapping is assured by the action of horizontal, movable guide carriage 136 which cooperates with the two feed subsystems and cutting means 130, both to support the traveling strip 124 as it crosses cutting gap 130, and to create the free end which gripper jaws 135 must engage in order to pull the strip into the die. To do this, carriage 136 is positioned to partially bridge, and reciprocate across cutting gap 130 under the stimulus of carriage actuator 139. As shown in FIG. 7, carriage 136 is configured in the form of a flattened, horizontally disposed hollow tube, having a width slightly greater than that of the strip and a generally arrow-shaped, longitudinal cross-section having a pointed, forward end 137 and a recessed tail-end 138 which is adapted to matingly engage the forwardmost end of threading plate 120 such that when strip 124 exits from said threading plate, it will proceed into and travel through the hollow portion of the carriage plate, across cutting gap 130 and into the system.

When the preprogrammed time comes to cut the paired strips to the proper length for the plates being processed, actuator 139 causes carriage 136 to retract outwardly, across the cutting gap. This exposes a portion of strip 124, which is approximately 1½ inches in length, to cutting means 132 positioned within cutting gap 130. This short length is stiff enough so that there is no appreciable sag or loss of tension, with the result that cutting is done in a precise and repeatable manner.

As shown in FIG. 7, cutting means 132 itself comprises a primary knife or guillotine 142 and a backup knife 143 or other cutting device which reciprocate vertically within cutting gap 130 under the stimulus of cutting actuator means 158, which is caused to operate when the required length of strip material has been peeled off of the rolls and fed into die 104 by gripper means 154. When actuated, the two knives are driven vertically through paired strip 124 so that about ½ inch of the exposed portion remains, providing a free end for reciprocating gripper means 134 to grasp for the next die loading sequence.

The structure of gripper means 134 is shown in FIG. 10. As shown, the gripper jaws 135 are essentially coplanar with slots 153 and reciprocate just over the radial axis of die 104. The loading cycle starts when gripper means 134 is advanced fully forward to its outermost position by hydraulic gripper drive means 144. As it advances towards the outer periphery of turntable 102, spring biased closed gripper jaws 135 are opened by the retraction of jaw actuator 160 so as to be able to grasp the free end of paired strip 124, to pull the paired strip into the machine for cut off as described above. Transfer of strip 124 into the die is facilitated by the arrow-shaped, tapered forward end of the guide 137 of guide carriage 136, which is adapted to matingly engage indentations 140 in the outermost ends of horizontal slots 153 so that the paired strip passes directly into and through the slots along the entire length of die 104, regardless of the particular length of the swatch cut off. Once passage is complete, the cut swatch is locked into position in slots 153 by the deactivation of spring loaded clamps 156, as hereinabove described. This placement and locking of cut paired strip 124 within the die completes the loading action at Work Station 1, at which time turntable 102 is rotatably indexed to advance the plate to Work Station 2, at turntable position 4.

STATION 2—RETENT-A-TAPE CUTTING, PLATE LOADING AND BOOT PLACEMENT

Stepwise rotation of turntable 102 brings the partially loaded die to Work Station 2. As shown in FIGS. 4 and 11 to 15 Work Station 2 includes turntable positions 2 and 3. The reason for this is to provide working room for the boot loader subsystem 300 which substantially fills the space over turntable position 2, and to provide working room for the machine operator to load both the plates and boots into their respector loader subsystems and to replace the several rolls of wrapping material as necessary.

As noted above, Retent-A-Tape is applied over the lowermost end 22 of plate 10 and to both its front and back surfaces 26 and 28, rather than being wrapped around the sides 31 and 32 as is the case with the fiberglass and Koroseal strips. Thus, it is necessary to provide a cut swatch 24 of Retent-A-Tape which is somewhat more than twice as long as the plate being wrapped. The diameter of Retent-A-Tape roll 24a used in the preferred embodiment is 38 inches, the nominal roll width of the material being 5.375±0.0371 inches which is essentially that of the plate being wrapped.

In operation a number of interrelated functions are performed at Work Station 2. To accomplish these functions, the Station comprises four major subsystems as follows: Retent-A-Tape roll-feeder subsystem means, designated generally as 200, to provide cut swatches of Retent-A-Tape; plate feeder subsystem means, designated generally as 250 to feed the prepasted plates into the Work Station; boot loader subsystem means, generally designated as 300, to insert plastic boots into the path of the injected plates for placement over the forward most end of said plates which clamp the Retent-A-Tape swatch so that it is carried through and set into die 104 with said plate; and tamping means, generally designated as 350, which places the partially wrapped plate firmly within a die.

The operation of the Retent-A-Tape and plate feeder subsystems is based upon a system originally developed for enveloping positive plates for automotive batteries which is described in U.S. Pat. No. 4,080,732, dated Mar. 28, 1978, and which is currently assigned to the Assignee of the present application. The major features and operation of these two subsystems will next be described.

Retent-A-Tape loader subsystem 200 is basically similar to the Koroseal and glass mat roll feeder subsystems 106 and 108 of Station 1 in that it is adapted to accommodate an outboard mounted roll feed subsystem 202 comprising a pair of rotatable hubs 204, each of which fits into a hub support 206. Hub support 206 is adpated to apply a slight frictional resistance to the free rotation of the hubs in order to counteract the angular momentum imparted to Retent-A-Tape roll 24a by the feeding motion.

Figure 14:
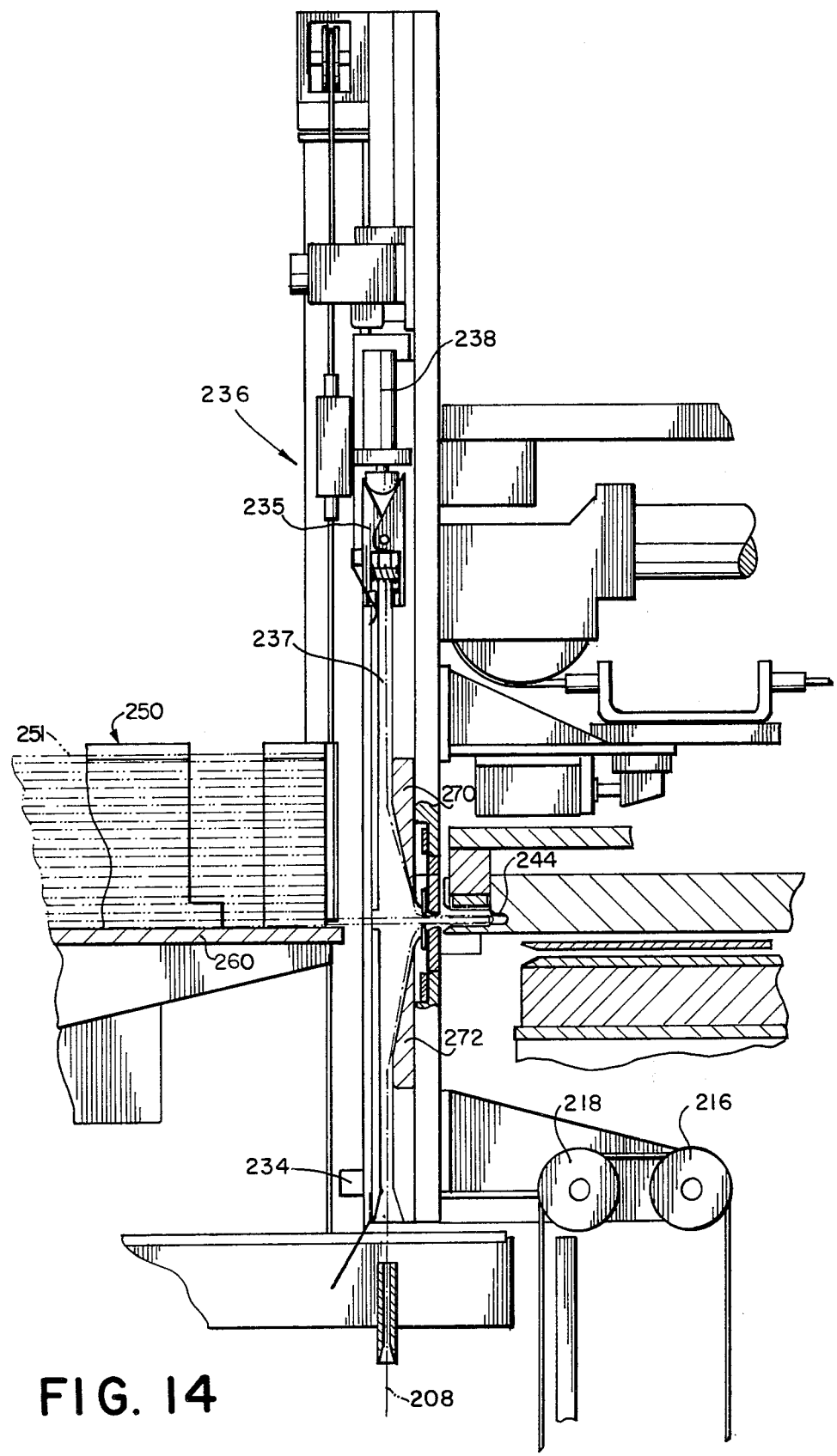
FIG. 14 is a partial view of the Retent-A-Tape length adjustment means.
Figure 15:
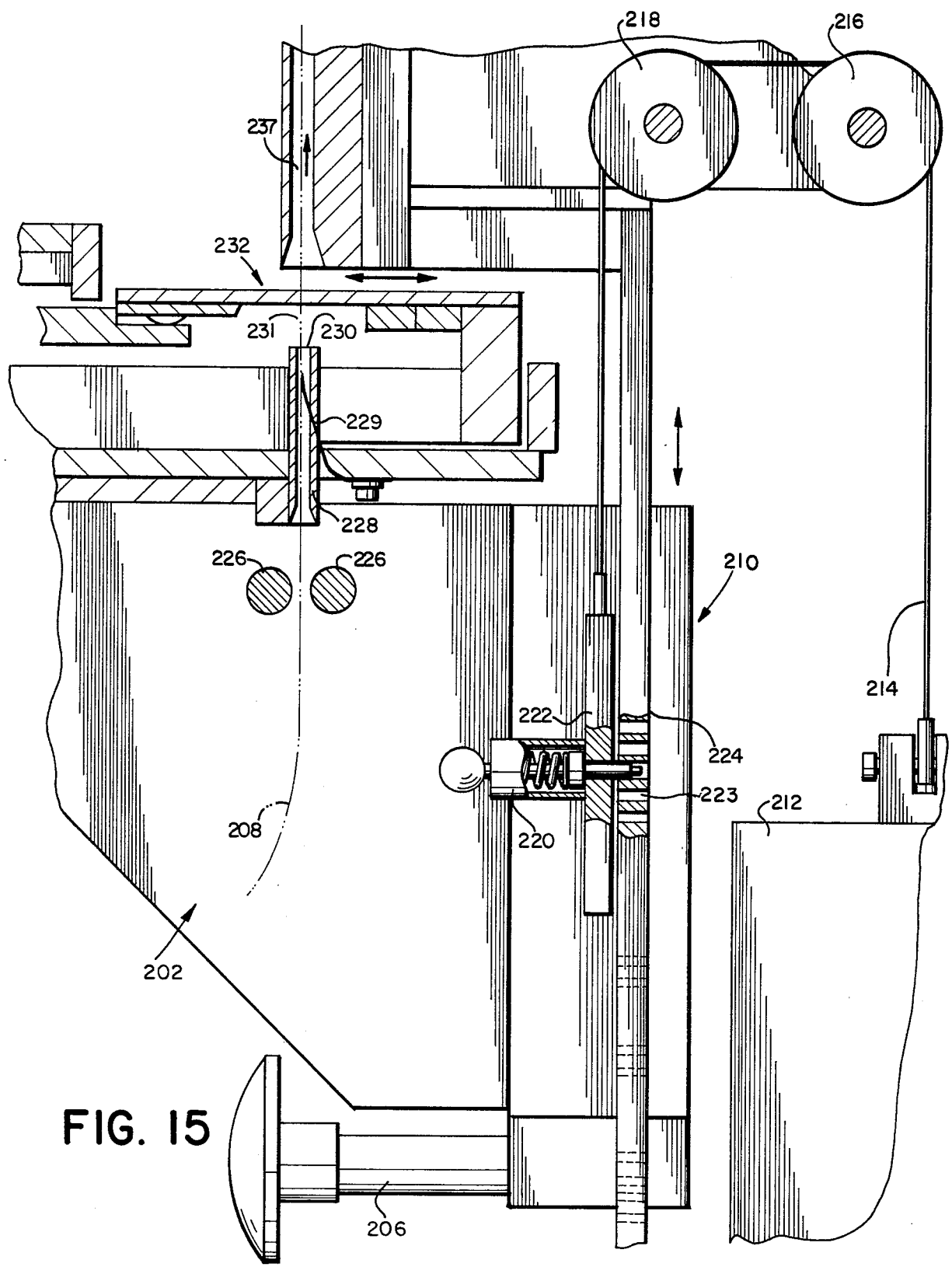
FIG. 15 is a detail of the Retent-A-Tape cutoff length adjustment means.

It should be remembered that the Retent-A-Tape swatch 24 cut from the pealed strip 208 must not only vary in length according to that of the plate being wrapped, but must always be positioned so that the advancing plate will contact it at its midpoint. Since the plane of plate injection and therefore the midpoint of the cut swatch, is substantially fixed it is necessary that the placement of the top and bottom edges of the swatch be adjustable within the Station prior to its being wrapped around the advancing plate so that its midpoint is properly aligned. This is done by adjustment of both the swatch cutoff and pullup points as shown in FIG. 14. Cutter adjustment means 210 comprises a counterweight 212, which is substantially equal to the combined weight of cutoff means 232 said counterweight being connected to subsystem 200 by a wire 214 passing over pulleys 216 and 218. Cutoff adjustment means 210 is held in place with locks 221 and spring plunger 220 which fits through the base plate 222 into one of a plurality of vertically disposed receiver holes 223 in the support plate 224 of frame 704. When locks 221 and plunger 220 are released, the entire cutoff assembly can be easily raised or lowered to fix the proper lower edge of the cut swatch according to the particular needs of the moment.

The length of the upper portion of swatch 24 is set by removable stops 223 and 234 located respectively in the upper and lower portions of pull-up channel 237. These establish the length of travel of vertical Retent-A-Tape gripper means 236. Upper stop 234 is set to cause the upwardly moving gripper jaws 239 to open and release the swatch at a point which is the same distance above feed gap 244 as cut off means 232 is below it, thus making the upper and lower cut portions of swatch 224 equal with the midpoint in line with feed gap 244. Lower stop 234 is set to limit the downward travel of gripper 234 so that when gripper jaws 239 are activated, they will correctly grasp the vertically standing free end of Retent-A-Tape strip 208.

Regardless of the positional settings of the cutoff and gripper subsystems, the Retent-A-Tape strip 208, after after it is peeled off of roll 24a, enters the system, passing through a parallel set of horizontally disposed guide rods 226 positioned on either side of the peeled strip, which serve the purpose of aligning the strip within the station and maintaining its tension as it is being pulled therethrough. To assure that alignment and tension are maintained, strip 208 passes through a fixed, relatively short, vertical channel guide 228, which, like threading plate 120 in Work Station 1, is a hollow, flattened tube. Located within this tube, just short of its upper exit point, is a leaf spring 229 which serves the purpose of holding the upstanding strip 208 in place after swatch 24 is cut off, as will hereafter be described. Located directly above exit point 230 is cutting channel 231 wherein horizontal cutting means 232 operates to sever the Retent-A-Tape swatch from the upstanding strip 208.

Figure 12:
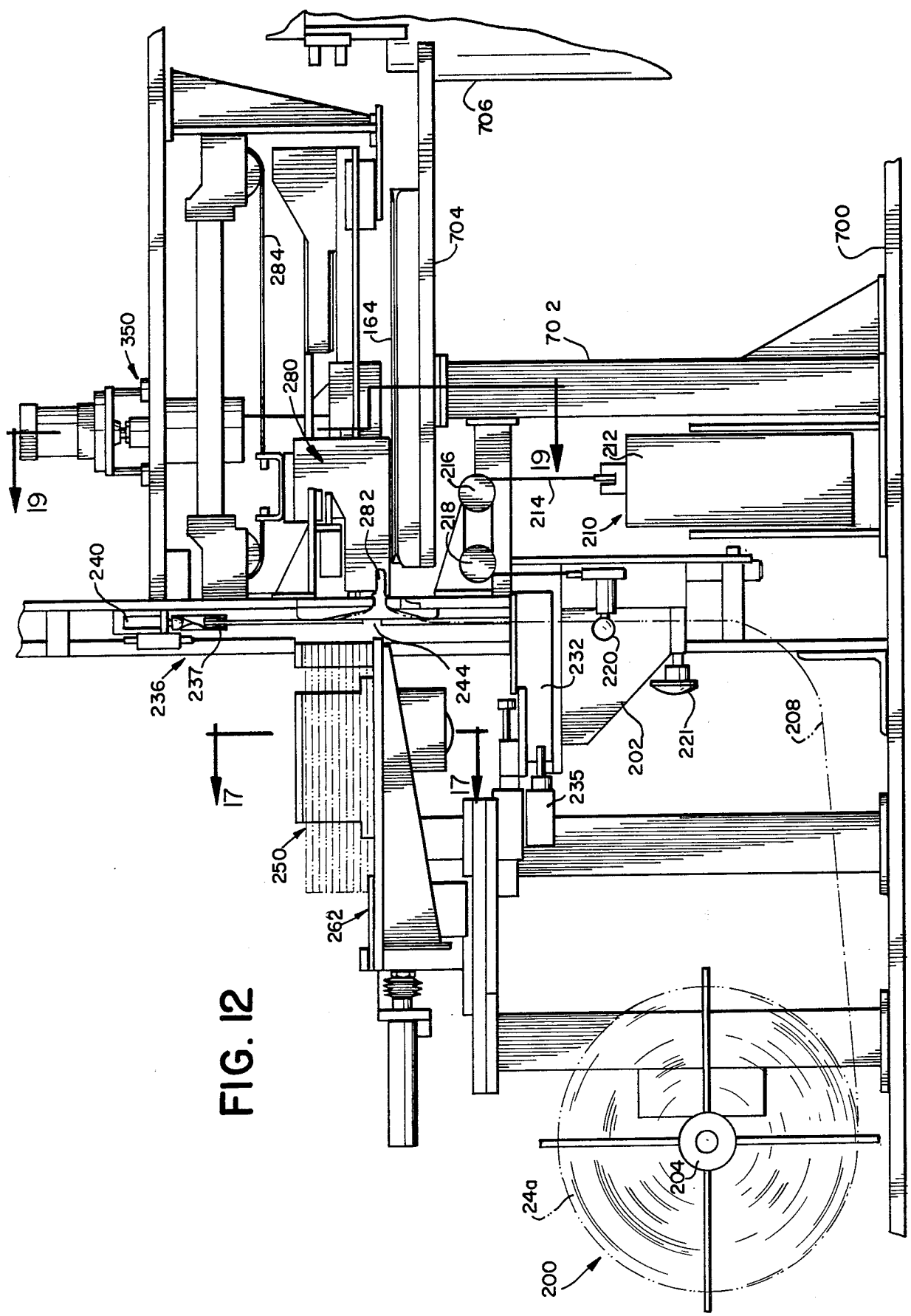
FIG. 12 is a partial side view of Work Station 2.

As was the case in Work Station 1, the free end remaining after cutoff is approximately ½ inch long and is retained in an upstanding position by leaf spring 229 as hereinabove described. As shown in FIG. 12, the free end is then picked up by vertically reciprocating Retent-A-Tape gripper means 236, which operate within vertical pull-up channel 237 under the control of gripper actuator 238 between stops 235 and 234 to first engage and grasp the free end of strip 208 and then pull it up to the point where the next swatch 24 is to be cut off.

Gripper means 236 comprises a pair of jaws 239, said jaws being adapted to open and close under the control of jaw actuator 240 so that it holds the free end in the gripper means 236 as it starts to pull up vertically within channel 237.

Figure 16:
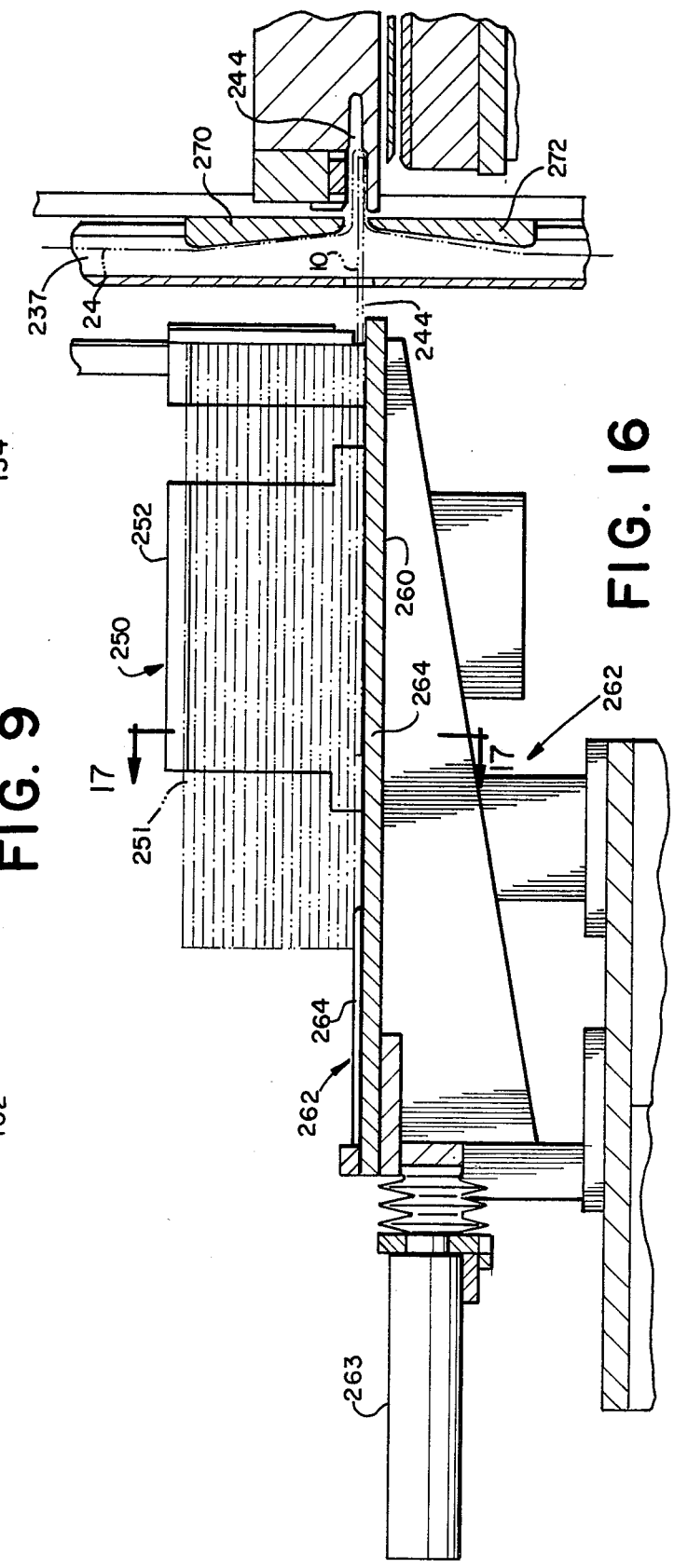
FIG. 16 is a detail of the plate feeder and Retent-A-Tape feeder subsystems as used in Work Station 2.

Located above the gripping point in channel 237 is a horizontal feed gap 244 which as shown in FIG. 16 is disposed on both sides of channel 237 and through which the plates being advanced by plate feeder subsystem 250 will pass on the way into the Work Station.

At this point, the plates contact the upstanding swatch 24 of Retent-A-Tape as hereinabove described. The control of this operation is maintained by control subsystem 800, which is set to actuate cutting actuator 235 to cut off the swatch at its lower end, and to actuate gripper jaw actuator 240 to release the swatch at its upper end so that the advancing plate is free to engage the swatch 24 and carry it into the system.

Figure 13:
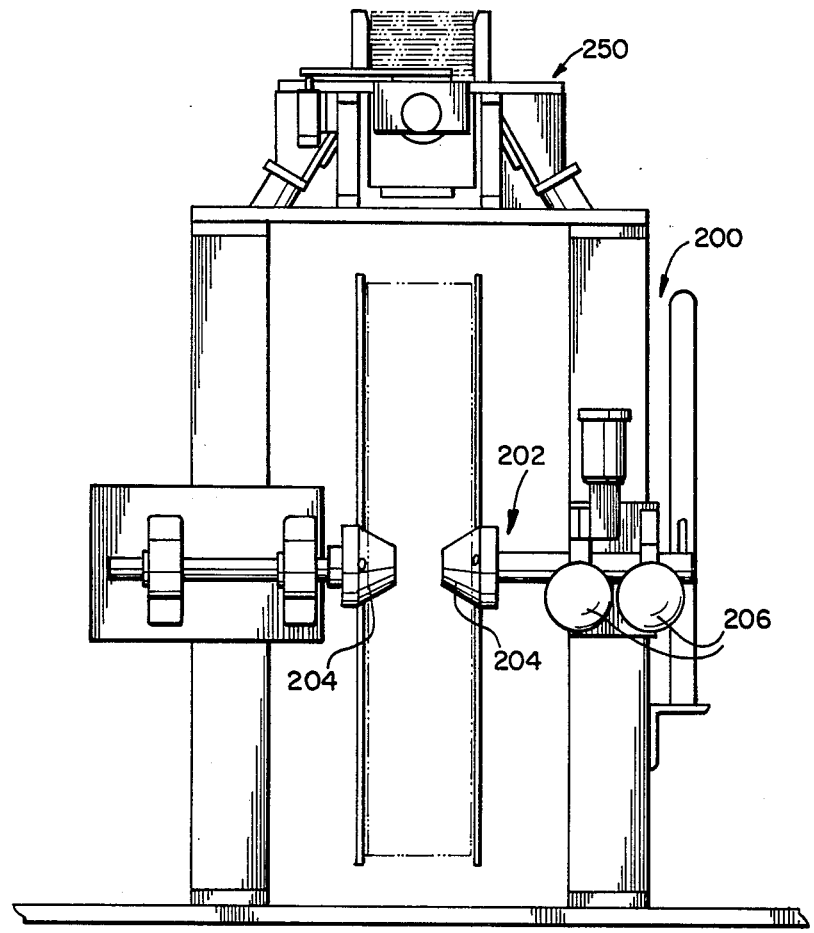
FIG. 13 is an end view of Work Station 2 as shown in FIG. 11.

The second major component of Work Station 2 is plate loader subsystem 250. The advancement of the plate from loader subsystem 250 into Work Station 2, through the feed gap causes the Retent-A-Tape to be wrapped around the plate as hereinabove described. As shown in FIGS. 12, 13 and 16, plate loader subsystem 250 is located outboard of Station 2 directly above Retent-A-Tape subsystem 200. As shown, it is adapted to receive a stack 251 of horizontally oriented, lengthwise disposed plates and feed them one at a time into the Work Station. Although manual plate preloading is customary in the industry, automatic plate preloading techniques may also be used.

Figure 17:
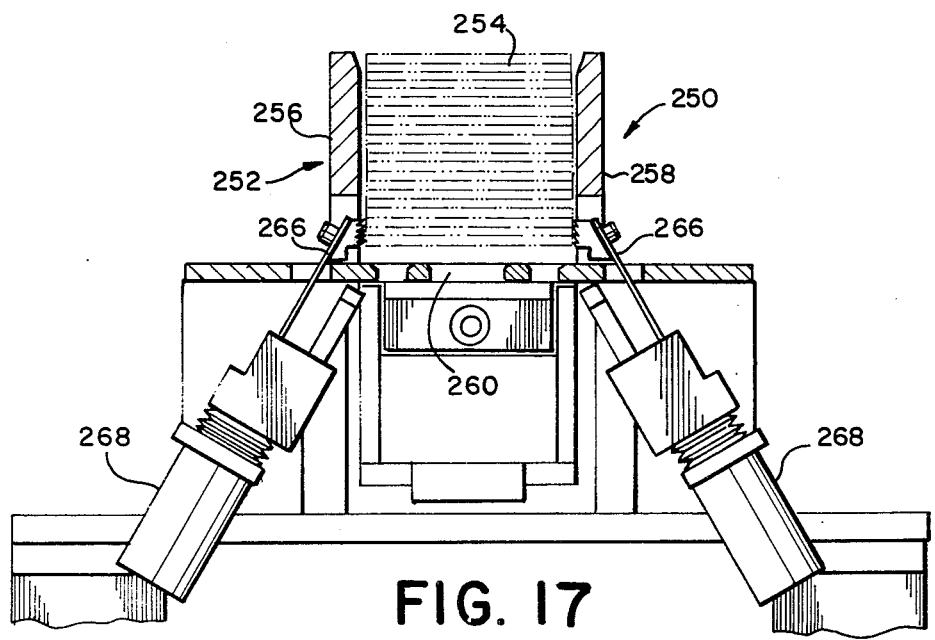
FIG. 17 is an enlarged view of plate feeder subsystem looking through the outer end.

FIGS. 16 and 17 show the basic structure of plate holder 252. Plate holder 252 comprises a roughly square-shaped, open-topped, flat bottomed channel 254 which is bordered on the left and right by sidewalls 256 and 258, and by bottom 260. Located within bottom 260 is shuttle means 262 which comprises an adjustable reciprocating shuttle plate 264. In use, shuttle plate 264 can be varied in length so that it will operate with plates of different lengths. When actuated by shuttle actuator 263 from its normal position behind plate stack 251, shuttle plate 264 engages the lowermost plate in the stack and propels the plate through the feed gap to contact the waiting Retent-A-Tape swatch 24 and boot 20, prior to being carried into the waiting die.

Because of the relatively heavy weight of the stack 251 and the fragility of the lead grid and dry lead oxide paste within the grid, in the preferred embodiment it is not possible to push the lowermost plate out from under the remaining plates in the stack above without causing substantial damage to one or both of these major plate features. To prevent this from happening, loader subsystem 250 further comprises a pair of inwardly angled, vertically uplifting stack grippers 266, one on either side of plate loader 250 and adapted to enter into the interior of channel 254 at the lower edges of the left and right walls 256 and 258. The grippers 266, when actuated by gripper actuator means 268 are themselves adapted to move upwardly and inwardly so as to engage and grasp stack 251, starting at the second lowest plate in the stack and raise it a sufficient distance to allow the lowermost plate to be freely and safely slid out from underneath the stack 251 when engaged by shuttle 264. After the lowermost plate has been pushed out of channel 254, and has passed through the feed gap, shuttle 264 is retracted to its starting position, and the stack grippers 266 lower the remaining plates back onto the bottom 260 for the next loading operation.

As noted above, plate feeder 250 is coordinated with the operation of Retent-A-Tape feed subsystem 200 so that, prior to movement of the shuttle 262, the upstanding strip 208 has been pulled into a position where the centerline of the swatch which will be cut from the strip is aligned with the feed gap and is ready to be cut off by the cutting means. As shown in FIG. 16 feed gap lies between inwardly canted upper and lower folding bars 270 and 272. After the advancing plate makes contact with the now cut-off Retent-A-Tape swatch 24, it carries it through feed gap so that the upper and lower portions of swatch 24 make contact with the inward cantation of the folding bars which act to direct said upper and lower swatch portions to drap themselves along the front and back surfaces of the incoming plate. As the Retent-A-Tape covered forward end 22 clears the gap, it is ready to receive a boot from a boot loader subsystem 300 and to be carried into the system for loading into the waiting die.

Figure 11:
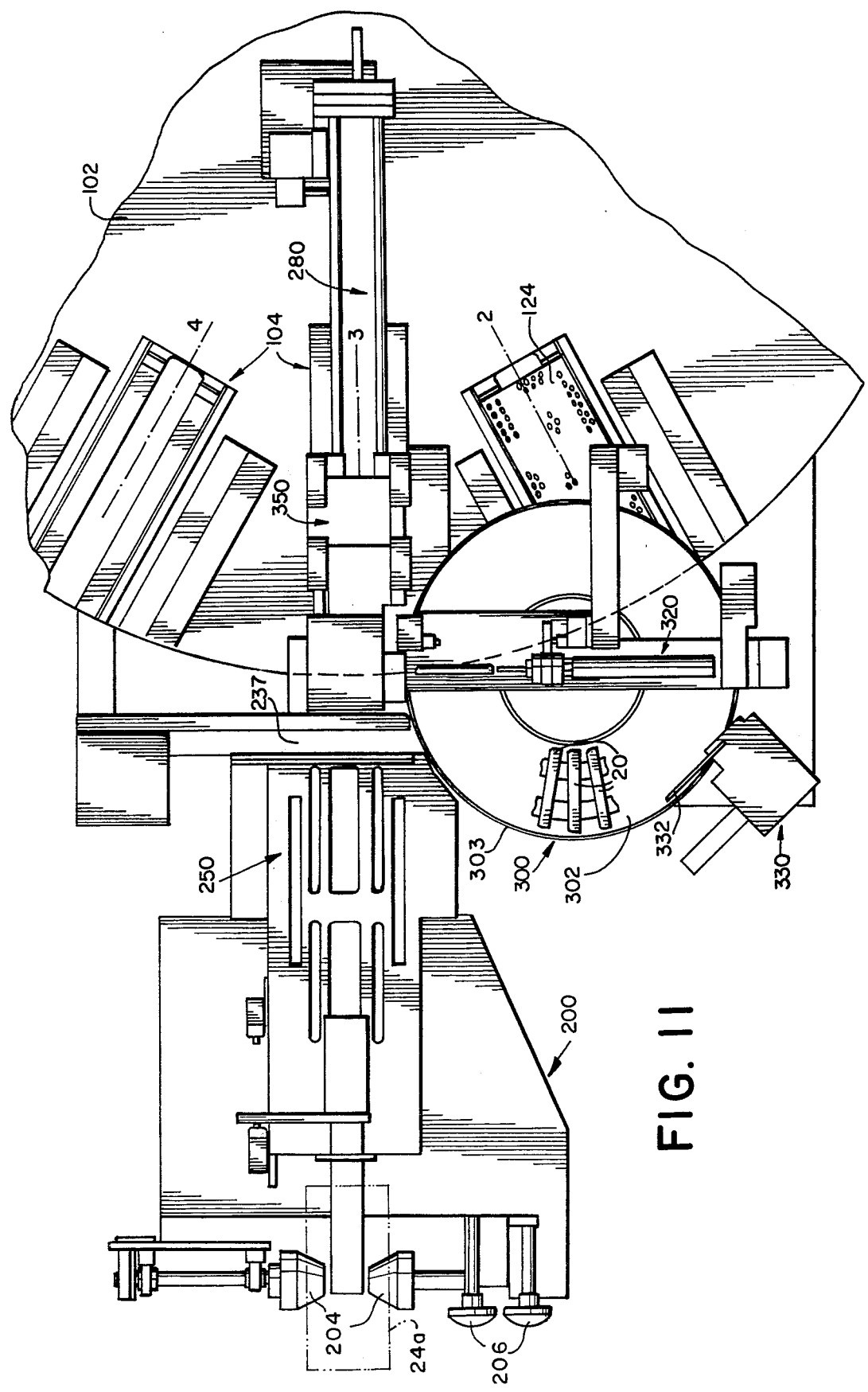
FIG. 11 is an overall plan view of Work Station 2, showing the turret boot loader subsystem in place.
Figure 18:
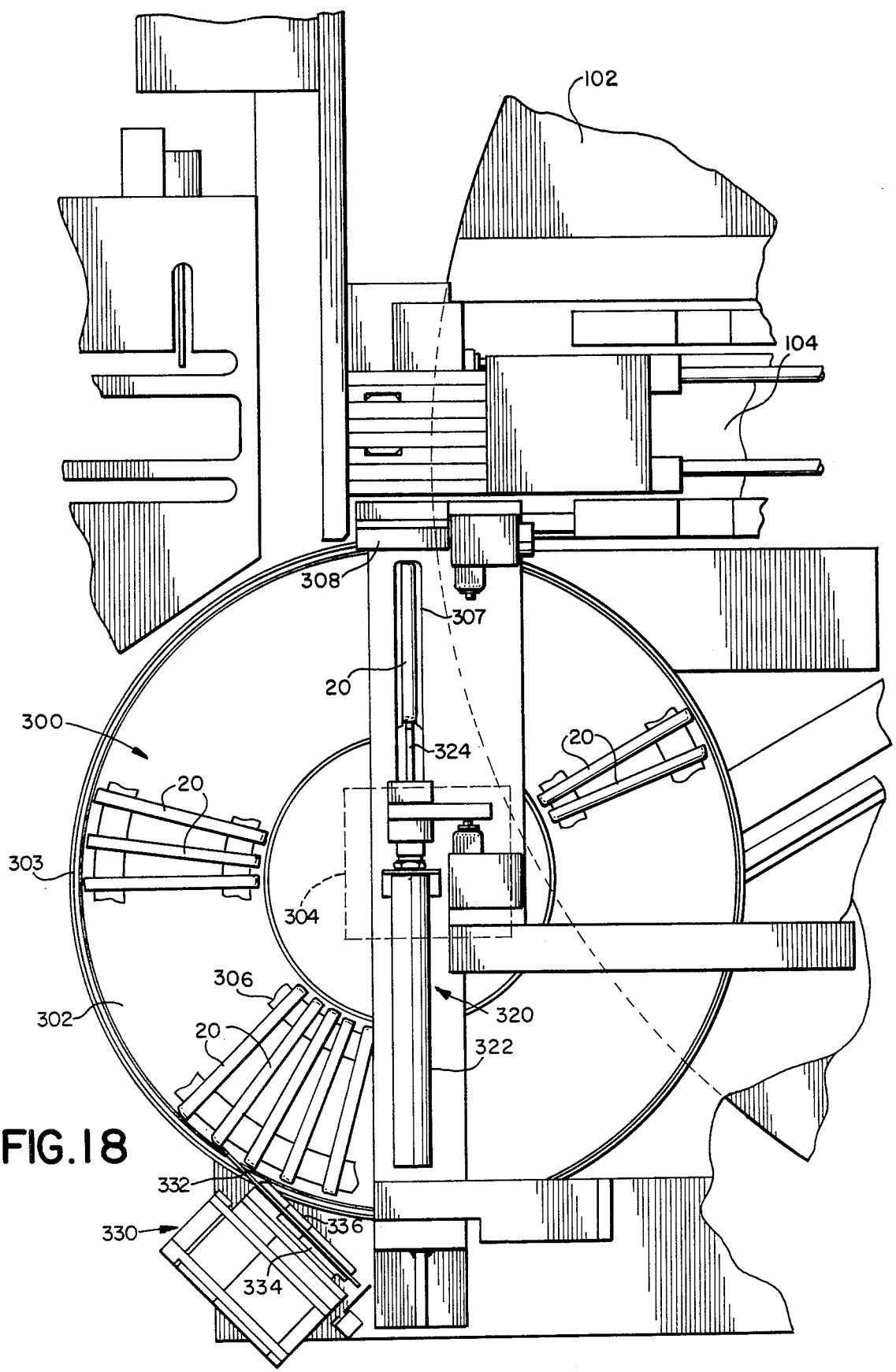
FIG. 18 is a detail showing the turret boot loader subsystem as used in Work Station 2.

Looking now at FIGS. 11 and 18, the details of turret boot loader subsystem 300 are shown. It comprises a horizontally disposed circular dial plate 302, rotatably connected to ratchet drive means 304, in a low sided circumferential frame 303 which is located and set over turntable plate 102. Within the top surface of dial plate 302 are a plurality of radially oriented channels 306, each having a sufficient length, width and depth to receive and accommodate one of boots 20, said boot being placed therein on its side so that it may subsequently be fitted onto the end of one of plates 10. Boot loader 300 is set within the Work Station so that dial plate 302 is essentially coplanar with plate loader 210 and is immediately adjacent to feed gap 244. As shown in FIG. 17, the channel 306 which is in the 180° position 307 is tangential to the outer periphery of turntable plate 102. It is from this position that the boot is fed into the apparatus. Control means 800 is programmed so that after one of boots 20 is inserted racheting drive means 304 will rotate the dial plate 302 to bring the next most of channels 306 into the 180° position 307 for a subsequent loading operation.

Located above the level of dial plate 302 and horizontally disposed along its 180° diameter is reciprocating boot pusher means 320. This comprises a pneumatic actuator 322 to which linear push rod 324 is operatively connected, push rod 324 being aligned so that upon extension of pusher means 320 it will fit into and move through 180° position 307 on dial plate 302.

Programmable control 800 is set to actuate boot pusher means 320 immediately as gripper means 236 starts to pull up the next swatch of Retent-A-Tape into position. Upon such actuation, push rod 324 moves forward and engages the innermost end of the boot in channel 307 so that it is pushed out of the channel through slot 308 in frame 303 into the cutting gap. As shown in FIG. 12 the properly oriented boot is at that point, gripped by plate gripper means 280, having a pair of jaws 282, which are formed so as to provide space to hold the boot in the proper orientation for the incoming plate without crushing or distorting it while providing enough support so that it will not roll over when first contact is made. Once the advancing plate with its drapped Retent-A-Tape seats itself into the boot, gripper means 280 then clamps onto the booted plate and under the stimulus of gripper actuator means 284 pulls it into the station until it is directly over center portion 145 of the die in the station at that time, at which point, it is released so that it may enter said hollow portion under the stimulus of tamper means 350 as will be described hereinbelow.

Boot loader subsystem 300 further comprises check means 330 to determine if each of the preloaded boots is properly oriented within its channel 306. When this is done the boot is on its side and further placed so that when in the 180° position 307, the open portion will faces outwardly from the station to allow the incoming plate 10 to be fitted therein. Such checking is done with probe means 322 which is placed more or less tangentially to the periphery of dial plate 302 which is adapted to be reciprocally inserted by probe actuator 334 into the opening of each boot 20 as it is indexed past. If the boot is properly oriented, the probe means 332 travels to its fullest extension, and transmits an enabling signal to keep the system operating. If however, the boot is not properly oriented, that is, it is rotated within its slot so that its sides or bottom are encountered by probe means 332, it cannot be fully extended as a result of which the enabling signal is not generated and a malfunction is indicated by control means 800.

Figure 19:
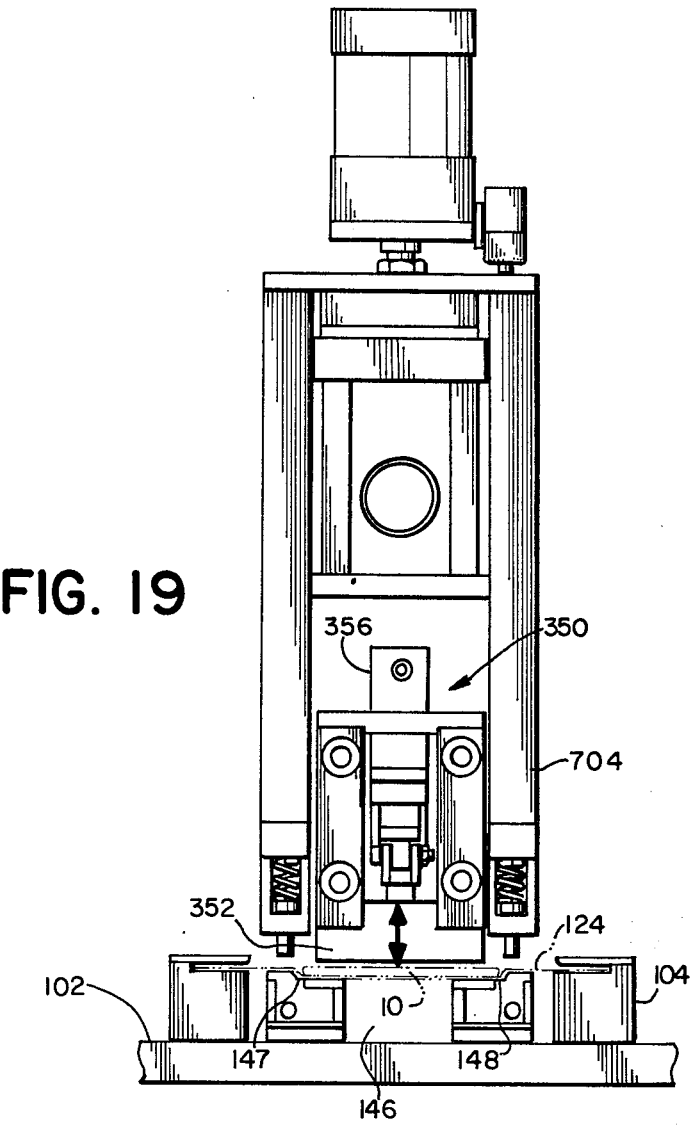
FIG. 19 is a detail showing the tamper subsystem as used in Work Station 2.

The last major subsystem of Work Station 2 is tamper means 350. As shown in FIG. 19, this comprises a spring biased push bar 352 which is reciprocally mounted onto frame 704 directly above the rest point of die center portion 146 within Work Station 2. Push bar 352 is activated by pneumatic actuation means 356 upon receipt of a timing signal from control means 800. This signal is generated when plate gripper means 270 has deposited the incoming plate 10 above hollow portion 145. When the plate is properly positioned actuation means 356 drives push bar 352 downward so that it engages the edges of the Retent-A-Tape covered top surface 26 of the now released plate and presses it firmly into the hollow center portion 145 between the spring loaded sides 147 and 148. In so doing, the sides of the plate make contact with the glass mat and Koroseal strips previously inserted into the die and carry the center portions thereof with it as it is tamped firmly into place. In so doing, the Koroseal, which has been softened by heating means 149, conforms itself to the side contours of the plate so that a close fit is achieved. This completes the sequence of wrapping operations in Work Station 2 and turntable 102 indexes to Work Station 3 at turntable position 6.

STATION 3—FINAL WRAPPING AND KOROSEAL SEALING

As shown in FIG. 4, the next stepwise rotation of turntable 102, by servo drive means 706 brings the now partially wrapped plate into Work Station 3, at turntable position 5 wherein the wrapping action is completed. This comprises two separate operations; foldover and sealing. Foldover itself, is performed in a two-step procedure; pushup and pushover.

Referring now to FIGS. 20 to 24 several views of Work Station 3 and its major components are shown. Located under die 104 in frame 704 is pushup means 400, shown in detail in FIG. 22 which comprises a pneumatically actuated, vertically reciprocating pair of parallel, vertically disposed lift plates 402 which in turn are attached to lifting actuation means 404. Lift plates 402 are spaced to fit into vertical slots 154 which lie between the hollow member 145 and extreme left and right sides 151 and 152 of die 104. When actuated, these rise up under Koroseal side strips 38 and 40 and the portion of glass mat strip which is held in horizontal guide slots 153 by guide bars 150 on said extreme left and right sides by spring loaded clamps 156 and pull them loose. Continued elevation of lift plates 402 causes them to engage the now loosened outer portions of the Koroseal and glass mat strips and gently rotate them around plate 10 until they are in a more or less vertical position relative to the plate.

Figure 20:
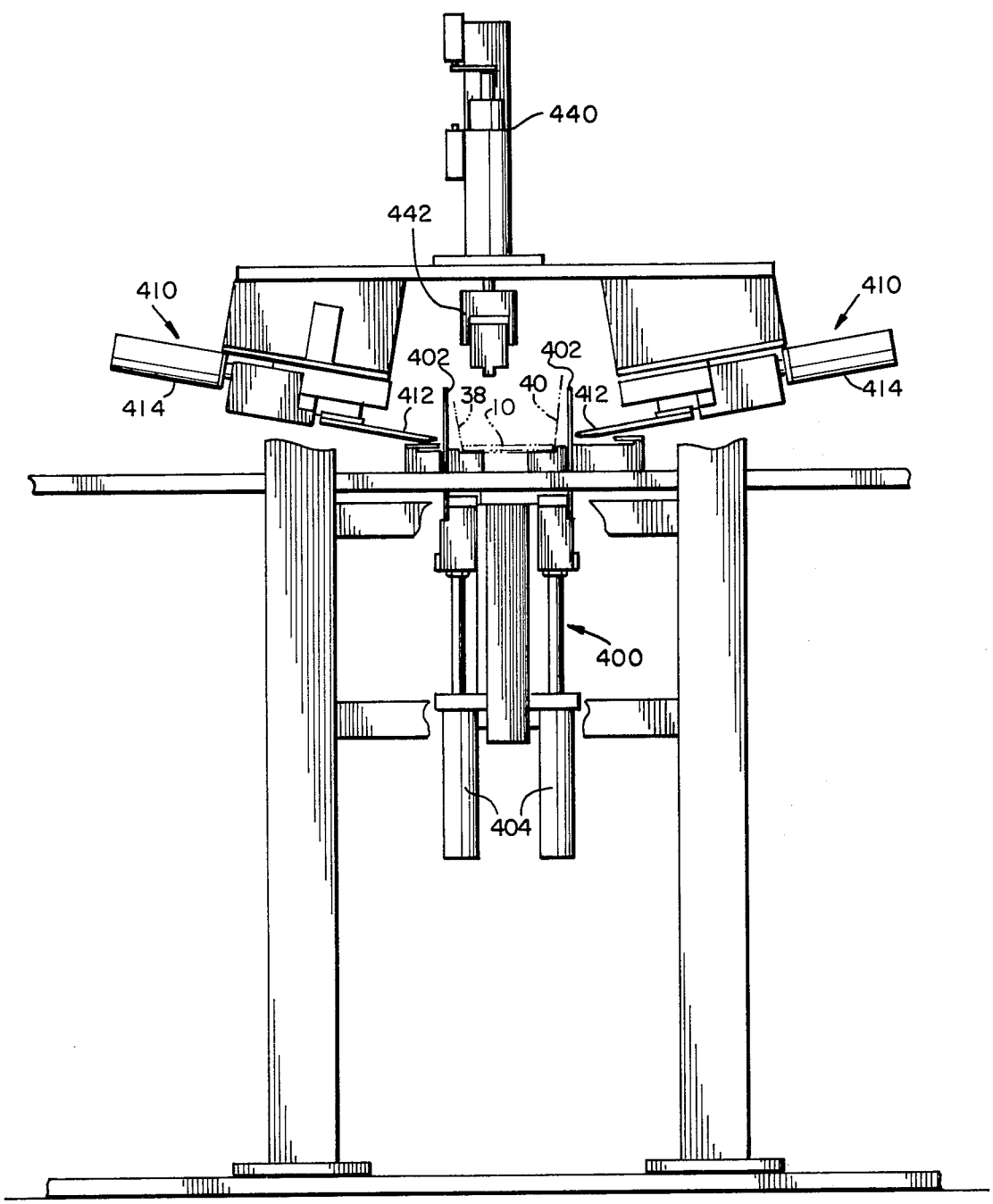
FIG. 20 is a end view of Work Station 3 of the apparatus as shown in FIG. 4.
Figure 21:
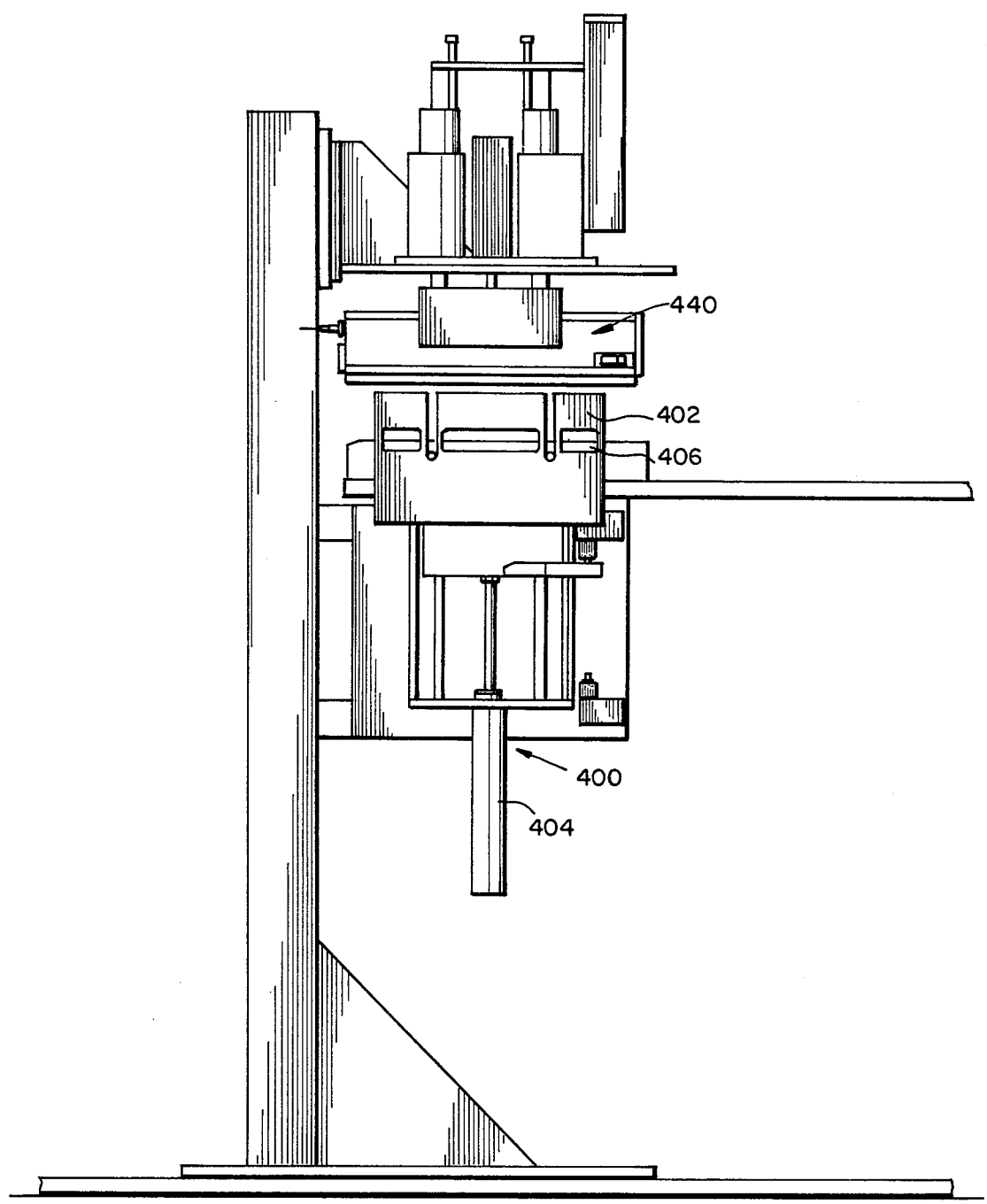
FIG. 21 is a side view of Work Station 3 as shown in FIG. 20.
Figure 22:
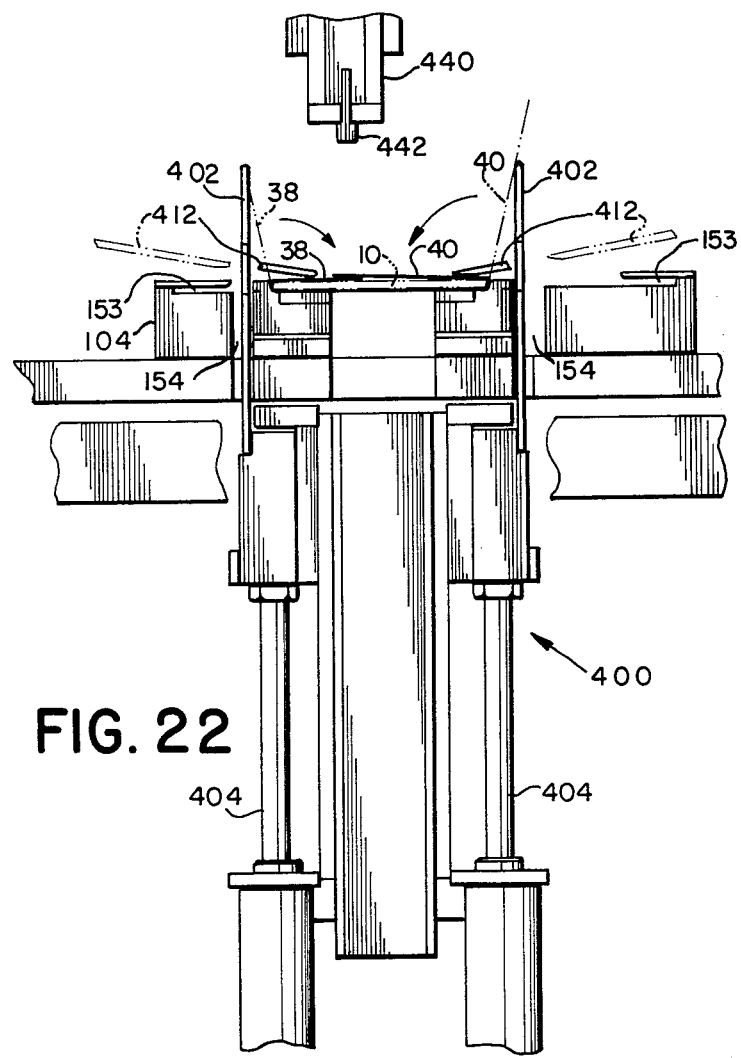
FIG. 22 is a detail of the pushup means subsystem as used in Work Station 3.
Figure 23:
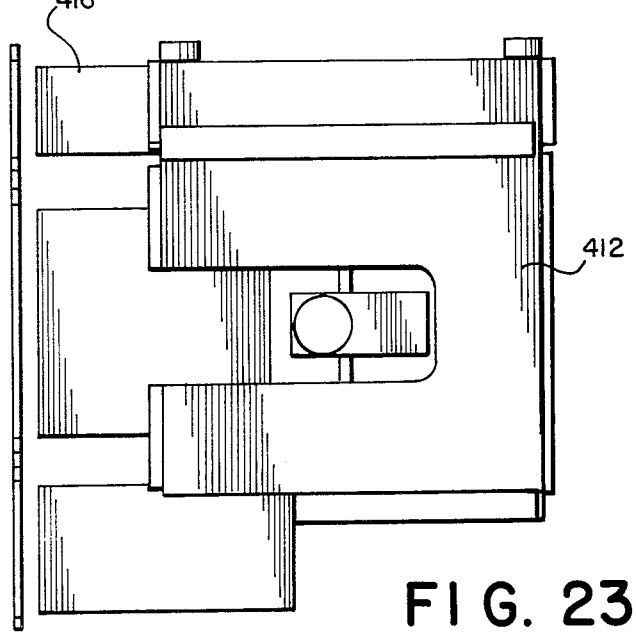
FIG. 23 is a detail of pushover means subsystem as used in Work Station 3.

As shown in FIG. 21 plate 402 further comprises a set of elongated horizontally disposed slots 406 which are machined into its lower portion and through which pushover means 410 will operate. Pushover means 410 itself, as shown in FIGS. 20 and 22 comprises a pair of angularly, inwardly directed oriented, multi-fingered plates 412 one on either side of die 104. These are actuated by pneumatic actuation means 414 after pushup means 400 has completed its upward motion. On actuation, the left and right push arms 412 advance inwardly in a slightly downward direction, so as to insert fingers 416 into and then through slots 406 to engage the vertically upstanding strips of Koroseal and glass mat and direct them to lean and eventually fall over the front surface 26 of the plate 10 in the die. When this is completed, the different widths 38 and 40 of Koroseal cover 12 will produce a slight overlap which forms the basis for seal 16 on that upper surface.

Figure 24:
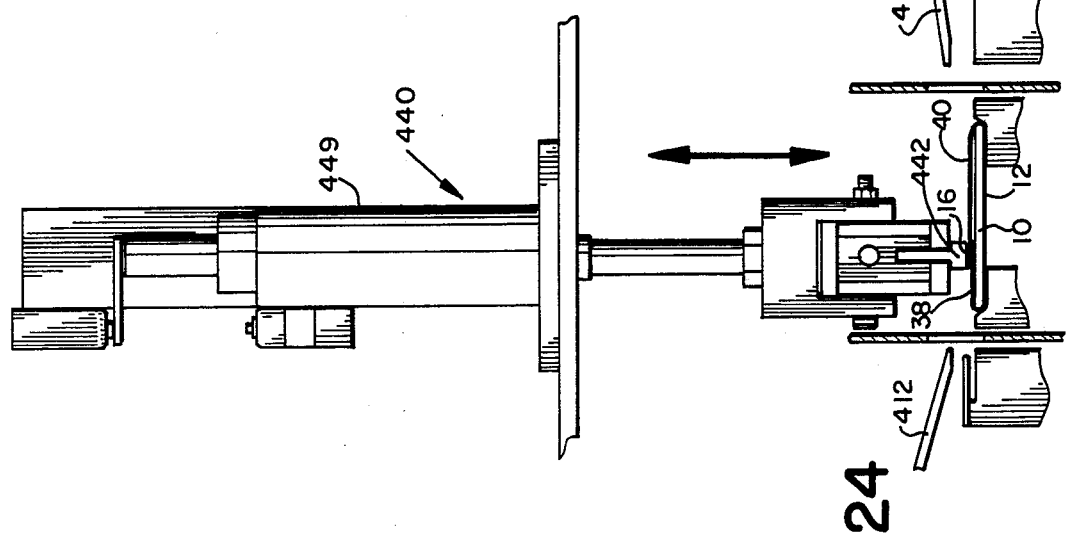
FIG. 24 is an end view of the heater subsystem of Work Station 3 producing the longitudinal cover seal on the plates wrapped within the subject apparatus.

At this point heat seal means 440 is actuated. As shown in FIG. 24, this comprises a strip heater 442, maintained at at an average temperature of 375°. Strip heater 442 reciprocally engages the wrapped but unsealed plate at seal seam 13, where the unbonded sides of Koroseal cover 12 overlap each other. Heater actuation means 449 controls the time period needed to form heat seal 16 along the front surface 26. This is normally only a matter of seconds, after which the heater and the pushup and pushover means retract and the turntable 102 indexes to Work Station 4.

STATION 4—KOROSEAL BOOT BONDING

Figure 25:
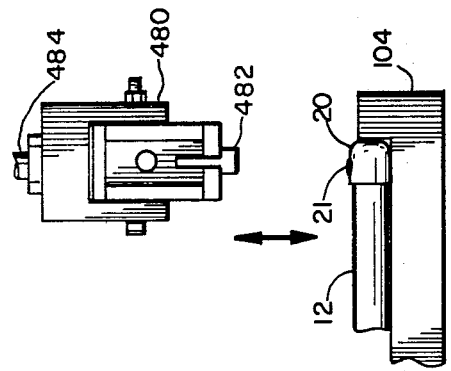
FIG. 25 is an enlarged view of the cover to boot seal means used in Work Station 4 of the apparatus shown in FIG. 4.

Continued stepwise rotation of turntable 102 brings the now fully wrapped, partially sealed plate into Station 4 at turntable position 6 wherein the wrapping operation is concluded. Here, boot 20 is bonded by seal 21 to Koroseal cover 12 so that future handling of the plate will not cause the boot to come off. As shown in FIG. 25, this is done herein by auxillary bonding means 480 which comprises a small heating element 482 which reciprocates vertically over the seam where the boot and cover join together. When the die arrives, heating element 482, which is pneumatically actuated, by pneumatic drive means 484 is depressed unitl it makes contact with the cover and boot and bonds them together. The actual size of seal 21 is fairly small, but is of sufficient length to accomplish the desired objective. The average operating temperature of heating means 482 is 375° F.

STATION 5—PLATE UNLOADING AND STACK FORMATION

Work Station 5, the next processing position in the subject apparatus is, as shown in FIGS. 4 and 26 to 28 located at position 10 on turntable 102. This location is primarily a matter of convenience and allows room to fit the necessary tooling and processing equipment, particularly for Work Station 2, to operate over turntable 102. Located outboard of frame 704 is conveyor 500 which is adapted to receive the finished wrapped plates from the Work Station 2 and transport them out of the system for further processing. Conveyor 500 is, like the other major units of this system, controlled by program control 800 so that it will begin to remove the plates from the system only after a preselected number have been deposited thereon. In the present operating embodiment of the system, this number is five but other convenient numbers may be selected.

Figure 27:
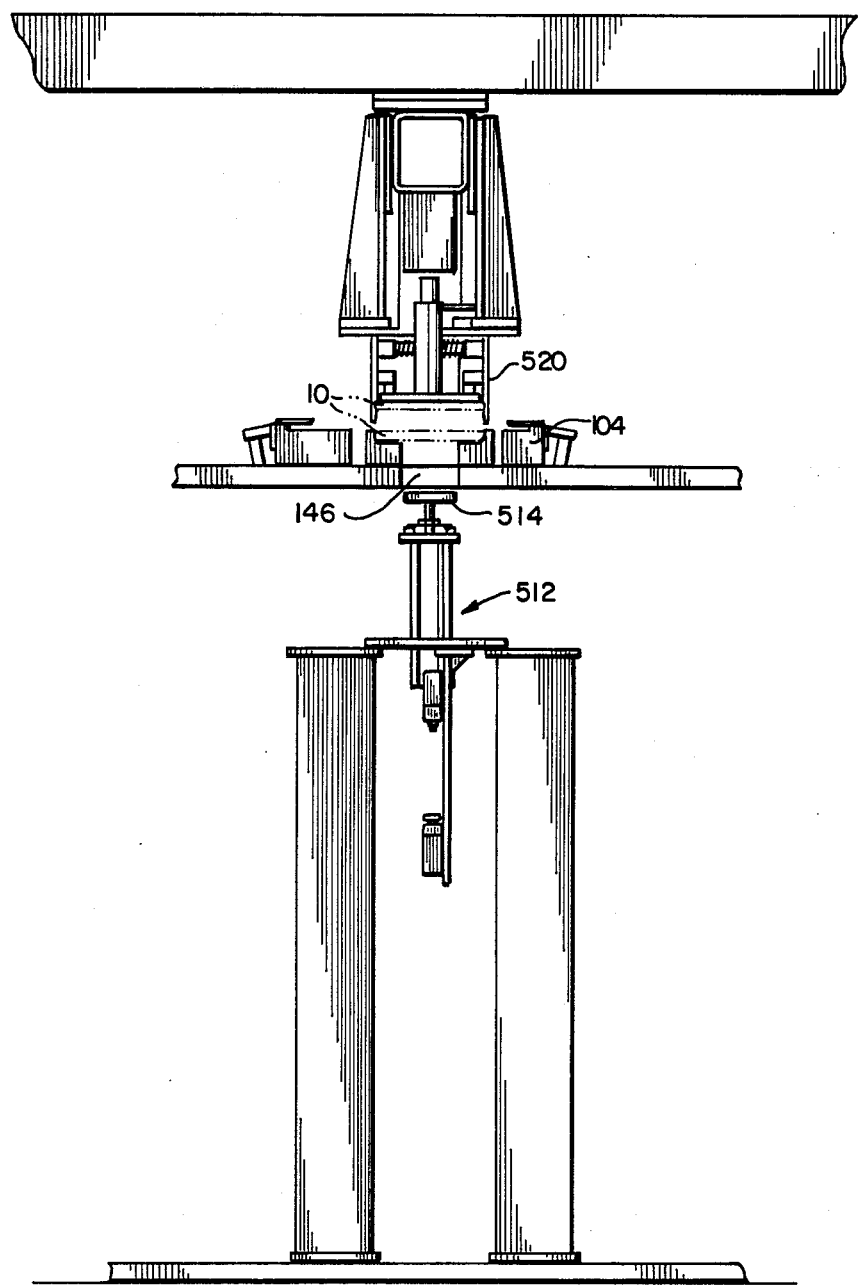
FIG. 27 is an end view of Work Station 5 showing the plate gripper means used to discharge the plates.

Referring now to FIGS. 26 and 27 it can be seen that the plates are deposited onto conveyor 500 by transport means 510, which is comprised of two subsystems. The first subsystem, pusher subsystem 512, is located under turntable 102 and comprises pneumatically actuated pusher paddle 514, which is positioned under the cutout portion 146 of turntable 102 which in turn is under the center portion 145 of die 104 holding the plate being discharged. Located immediately above the die and plate combination in turntable position 10 is the second subsystem of transport means 510, gripper means 520. Subsystem 520 comprises a pair of radially disposed parallel gripper jaws 522, spring biased to assume a "closed" aspect just slightly narrower than a plate. Gripper jaws 522 are reciprocally mounted on radially disposed track means 524 and carried by movement means 526 from a first position on the interior of Work Station 5 to a second position just over conveyor 500.

Figure 28:
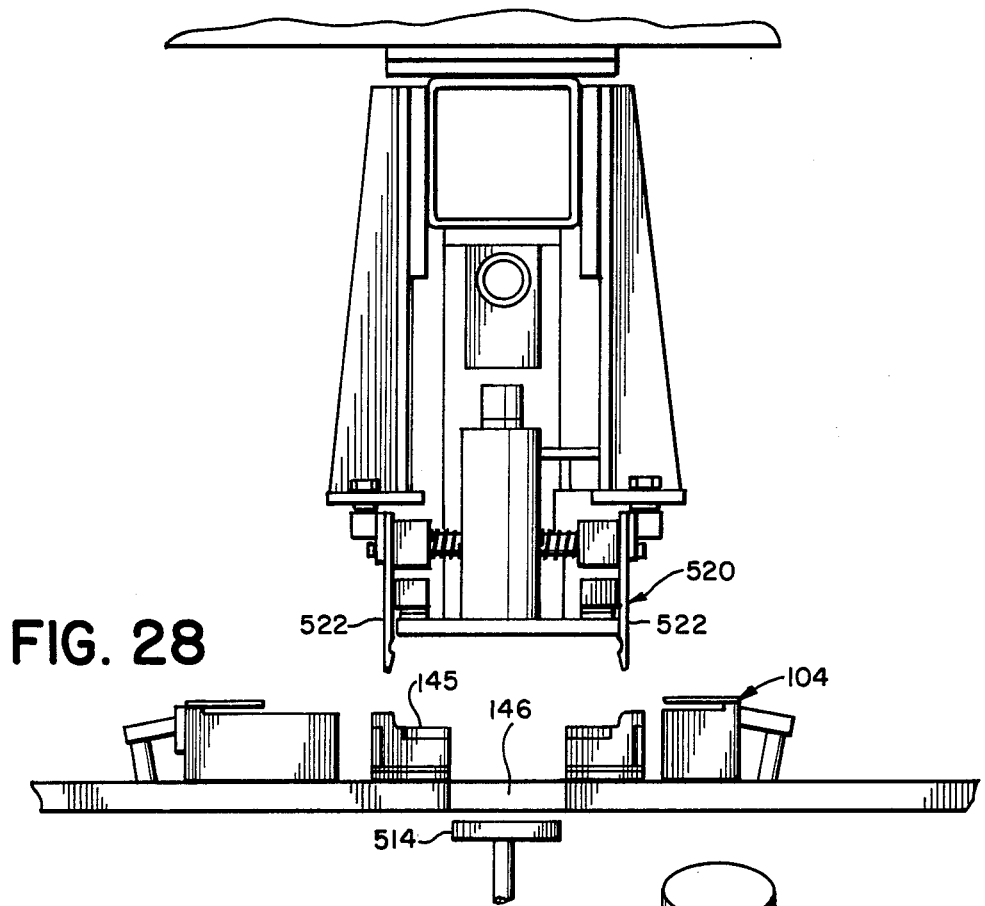
FIG. 28 is an enlarged detail of the gripper means shown in FIG. 26.

Gripper means 520, as shown in FIG. 28, is programmed so that gripper jaws 522, are moved over the die When so positioned, pusher means 512 is actuated and pusher paddle 514 is elevated to pass through the turntable cutout hollow portion 145 of die 104 and make contact with the under side of the plate therein. Continued upward motion of pusher paddle 514 them pushes the plate out of the die upward into the spring biased gripper jaws 522, which are at rest directly above the uprising plate so as spread them apart enough to engage the plate sides and grip them firmly. At the topmost point of travel for pusher paddle 514, gripper means 520 is actuated and the pusher means 512 retracted. Actuation of transport means 510 moves gripper means 520 on radially disposed track 524 to a second position just over conveyor 500. Gripper means 520 is then deactivated, the gripper jaws 522 opened and the plate deposited onto the conveyor to complete the discharge operation.

STATION 6—THERMAL MONITORING

Figure 29:
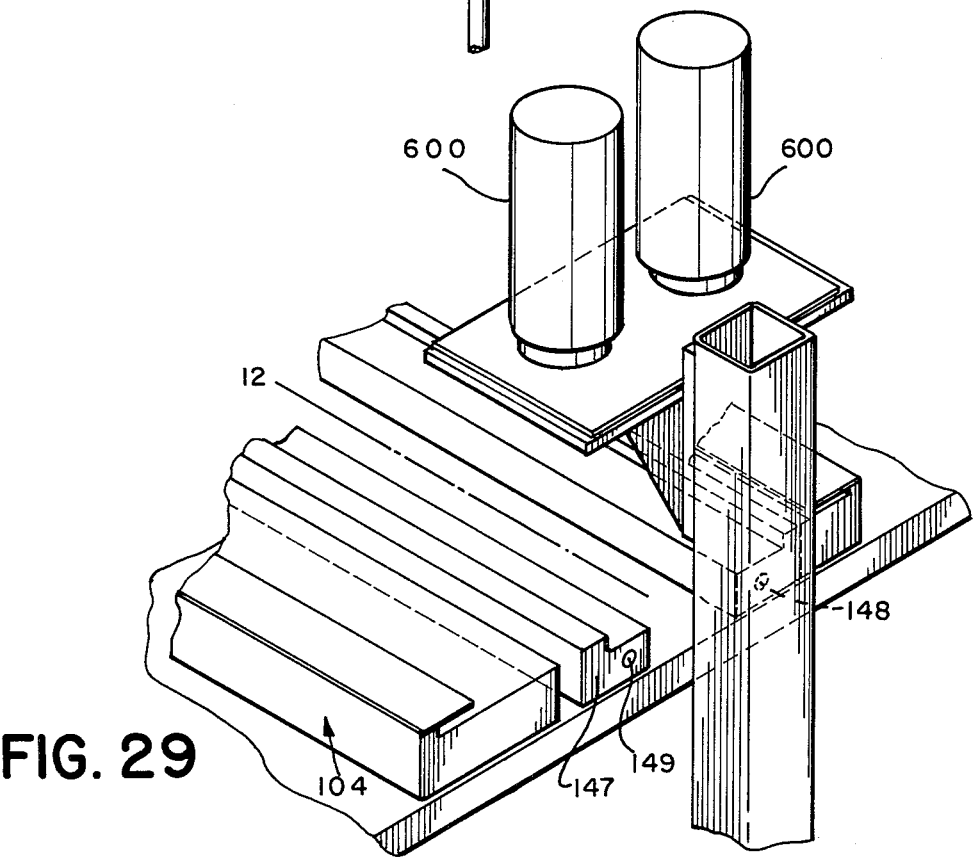
FIG. 29 is an isometric view of the temperature monitoring means used in Work Station 6 of the apparatus shown in FIG. 4.

Station 6, the last Work Station is shown in FIG. 29 at turntable position 12. Here the now empty dies are monitored to determine if they are at the proper temperature for continued operation. The monitor has a pair of infrared detectors 600 which check the temperatures on sides 147 and 148 of an empty die 104 before it is rotated back to position 1. When properly heated by internal resistance heater means 149, one of which is located within each side of the die, the normal working temperature is 170° to 200° F. A temperature reading not within the selected range is indicative of a malfunction. The readings from detectors 600 are fed into programmable control 800. If unacceptable values are detected, programmable control 800 is empowered to shut down the system so the discrepant die may either be repaired or replaced.

It is to be understood that the foregoing suggested apparatus as exemplified by the figures, is intended to be illustrative of a preferred embodiment of the subject invention and that many options will readily occur to those skilled in the art without departure from the spirit or the scope of principals of the subject invention.

What we claim is:

1. An apparatus for doubly wrapping and enveloping a rectangular storage battery plate having bottom and side edges comprising:
   fixture means for selectively receiving a battery plate;
   first supply means for depositing a first swatch of an enveloping material on said fixture means;
   second supply means for depositing a second swatch of a wrapping material on said fixture means such that said second swatch is on top of said first swatch;

means for depositing a wrapped and booted battery plate on said fixture means, including means for laterally displacing a battery plate, bottom edge first, from a selected ready position;

third supply means for interposing a third swatch of a wrapping material in the path of lateral displacement of said battery plate such that the bottom edge intercepts the middle of said third swatch which is thereby wrapped about said battery plate; and fourth supply means for interposing a selectively configured boot in the path of lateral displacement of said battery plate such that said boot envelopes the bottom edge of said battery plate wrapped by said third swatch;

means for wrapping said first and second swatches about the battery plate, including means for tamping said plate into said fixture such that said first and second swatches conform to the side edges of said plate; and means for folding said first and second swatches over said plate such that end portions of said first swatch overlap; and means for selectively bonding said boot and said first swatch so as to define an outer envelope which maintains said second and third swatches wrapped about said battery plate.

2. An apparatus according to claim 1 wherein:

said first swatch comprises a heat-softenable thermoplastic; and said fixture means includes internal heating means for selectively heating portions of said first swatch such that the softened portions of said first swatch conform to the contour of the side edges of said battery plate as said first swatch is wrapped about said plate.

3. An apparatus according to claim 2 further comprising:

means for monitoring the temperature of said fixture means; and means for controlling said internal heating means responsive to said monitoring means.

4. An apparatus according to claims 1, 2 or 3 wherein:

both said boot and said first swatch comprise a heat-fusible material; and said bonding means comprises heat fusing means for fusing a portion of said boot to said first swatch and for fusing said overlapping end portions of said first swatch to each other.

5. An apparatus according to claim 1 wherein:

said first supply means and second supply means conjointly deposit said first and second swatches on said fixture means.

6. An apparatus according to claims 1 or 5 further comprising means for selectively holding said first and second swatches on said fixture means while said plate is deposited thereon.

7. An apparatus according to claim 1 wherein said battery plate depositing means further comprises:

magazine means for supporting a stack of battery plates such that the bottom plate is located at said ready position; and means for selectively feeding a battery from said magazine means, including means for elevating the battery plates resting on top of the bottom plate; and means for laterally displacing said bottom plate from beneath the elevated plates onto said fixture means.

8. An apparatus according to claim 1 further comprising means for removing the doubly wrapped and enveloped battery plate from said fixture means.

9. A method for doubly wrapping and enveloping a rectangular storage battery plate having bottom and side edges comprising:

depositing a first swatch of an enveloping material on selectively configured fixture means;

depositing a second swatch of a wrapping material on said fixture means such that said second swatch is on top of said first swatch;

depositing a wrapped and booted battery plate on said fixture means, including laterally displacing a battery plate, bottom edge first, from a ready position;

interposing a third swatch of a wrapping material in the path of lateral displacement of said battery plate such that the bottom edge intercepts the middle of said third swatch which is thereby wrapped about said battery plate; and interposing a selectively configured boot in the path of lateral displacement of said battery plate such that said boot envelopes the bottom edge of said battery plate wrapped by said third swatch;

wrapping said first and second swatches about the battery plate, including tamping said plate into said fixture such that said first and second swatches conform to the side edges of said plate; and folding said first and second swatches over said plate such that end portions of said first swatch overlap; and selectively bonding said boot and said first swatch so as to define an outer envelope which maintains said second and third swatches wrapped about said battery plate.

10. A method according to claim 9 wherein said first swatch comprises a heat-softenable thermoplastic, further comprising:

selectively heating said fixture means to soften portions of said first swatch such that the softened portions of said first swatch conform to the contour of the side edges of said battery plate as said first swatch is wrapped about said plate.

11. A method according to claim 10 further comprising:

monitoring the temperature of said fixture means; and controlling said internal heating means responsive to said monitoring means.

12. A method according to claims 9, 10 or 11 wherein both said boot and said first swatch comprise a heat-fusible material and wherein said selected bonding comprises:

fusing a portion of said boot to said first swatch; and fusing said overlapping end portions of said first swatch to each other.

13. A method according to claim 12 wherein said first and second swatches are jointly deposited on said fixture means.

14. A method according to claims 9 or 13 further comprising selectively holding said first and second swatches on said fixture means while said battery plate is deposited thereon.

15. A method according to claim 9 wherein said battery plate depositing further comprises:

supporting a stack of battery plates with magazine means such that the bottom plate is located in said ready position; and selectively feeding a battery plate from said magazine means, including
  elevating the battery plates resting on top of the bottom plate; and
  laterally displacing said bottom plate from beneath the elevated plates onto said fixture means.

16. A method according to claim 9 further comprising removing the doubly wrapped and enveloped battery plate from said fixture means.

17. An apparatus for wrapping and enveloping a rectangular battery plate comprising:
  a plurality of selectively configured battery plate receiving fixtures;
  first supply means for depositing a swatch of an enveloping material on each fixture;
  means for sequentially locating each said fixture having a swatch of enveloping material deposited thereon at a selected operational location;
  means for depositing a wrapped and booted battery plate on each fixture located at said operational location, including
    means for sequentially locating battery plates at a selected ready position proximate said operational location;
    means for laterally displacing each battery plate from said ready position onto a fixture positioned at said operational location;
  second supply means for interposing a swatch of wrapping material in the path of lateral displacement of each battery plate such that the leading edge of the plate intercepts the middle of said wrapping material swatch which is thereby wrapped about said plate; and
  third supply means for interposing a boot in the path of each battery plate such that said boot envelopes the wrapped leading edge of the battery plate as it is displaced;
  means for folding said enveloping swatch about each battery plate deposited on each fixture; and
  means for bonding said boot and said enveloping swatch to define an envelope for maintaining the wrapping material swatch wrapped about each said plate.

18. An apparatus according to claim 17 wherein said battey plate sequential locating means comprises:
  magazine means for supporting a stack of battery plates such that the bottom plate is located at said ready position;
  means for elevating the plates above said bottom plate while said bottom plate is laterally displaced onto one of said fixtures; and
  means for releasing said elevated plates whereby the next plate is located at said ready position.

19. An apparatus according to claim 17 wherein said second supply means comprises:
  means for feeding an end portion of a roll of wrapping material across the path of lateral displacement of said battery plates; and
  means for severing said end portion from said roll so as to define each said swatch.

20. An apparatus according to claim 17 wherein said third supply means comprises:
  carousel means positioned tangentially to the path of lateral displacement of said battery plates;
  said carousel means having a radially disposed array of boot holders;
  means for rotationally indexing said carousel means to sequentially locate each said boot holder at a selected ready position; and
  means for radially displacing a boot from a boot holder located in said ready position from said carousel means into the lateral displacement path of said battery plate.

21. An apparatus according to claim 20 wherein said carousel means further comprises means for sensing the presence of a boot in each of said boot holders.

22. An apparatus for automatically applying wrapping material to a plate for use in a storage battery, said plate having front and back surfaces, left and right sides and upper and lower edges, said wrapping material comprising a first layer of acid resistant, thermoplastic elastomeric material, a second layer of flexible, acid resistant material, and a third layer of flexible acid resistant material, said first, second and third layers being disposed relative to each other so that they form an outermost, interior and innermost portion respectively of a porous envelope acting to cover said surfaces, sides and lower edge to electrically insulate said plate, said wrapping apparatus comprising:
  frame means further comprising a base and support legs;
  movable transport means supported by said frame means, said transport means further comprising at least one die fixture, said fixture being adapted to receive a cut swatch of said wrapping material and having means for holding said swatch while one of said plates is being deposited thereonto, said transport means acting to carry said die fixture through said apparatus;
  wrapping material input means introducing said swatch of wrapping material into said apparatus including
    (a) feed means to dispense said third layer of wrapping material; and
    (b) layer gripper means adapted to grasp said third layer of wrapping material and pull it up and release it in front of the bottom edge of a plate which will be inserted by said plate loader means;
  plate loader means for inserting a plate into said die fixture after said swatch has been introduced;
  wrapping means adapted to fold said cut swatch around said plate;
  seal means adapted to bond the edges of said swatch to form said insulated envelope; and
  ejection means adapted to remove said sealed, wrapped plate from said fixture, said means for wrapping material input, plate loader wrapping, sealing and ejection being attached to said frame and disposed within said apparatus to form a coordinated set of work stations.

23. The apparatus according to claim 22 wherein said third layer of wrapping material is received in and dispensed from a continuous roll from which a strip of material is fed into third layer gripper means and wherein said third feed means comprises hub means adapted to hold said roll and further comprises frictional resistance means adapted to prevent free rolling of said hub means so that said third layer of material may be accurately dispensed.

24. The invention of claim 23 wherein said third layer gripping means is adapted to pull said third layer in a substantially vertical direction within a pullup channel which lies between said plate loader means and said turntable wherein third layer of material may be accurately dispensed.

25. The apparatus of claim 24 wherein said wrapping material input means further comprises second cutting means disposed in said pullup channel and cooperating with said third layer gripper means under the control of an internal control means within said apparatus to cut said third layer to a preset length more or less equal to twice the length of said plate, while leaving a free end for said third layer gripper means to grasp at the start of the next cycle.

26. The apparatus of claim 25 wherein said second cutting means is a guillotine.

27. The apparatus of claim 26 wherein said third feed means further comprises draping means adapted to contact the upper and lower portions of said released third layer and cause them to drape themselves smoothly around said plate lower edge, over said plate front surface and under said plate back surface as said plate is moved toward said die fixture by plate loader means.

28. The apparatus of claim 27 wherein said plate loader means comprises;
 (a) plate holder means adapted to receive a stacked plurality of plates, said plates being disposed within said stack holder so that they are radially oriented with respect to said turntable with the radial axis being parallel to said left and right sides of said plate and said bottom edge closest to the periphery of said turntable and further disposed so as to fit into said hollow portion of a die fixture when it is inserted into said die fixture;
 (b) stack gripper means adapted to engage said plate stack within said plate holder means at the second lowermost plate and to raise said stack above the lowermost plate within the stack; and
 (c) shuttle means adapted adapted to engage the upper edge of said lowermost plate and push it into said die fixture, when said die fixture has been carried to a position in front of said plate loader means by said transport means, said plate loader means cooperating with said third layer gripper means so that said third layer is placed, when released, with its midpoint in front of said plate at the time said plate is inserted into said die fixture so that when said plate insertion occurs, the lower edge of said plate will contact said third layer at said midpoint and carry it into said die fixture.

29. The apparatus of claim 28 wherein said wrapping material further comprises an elastomeric boot adapted to fit over the lower edge of said plate after said third layer has been applied thereto and to clamp said third layer to said plates as it is being inserted into said die fixture wherein said plate wrapping apparatus comprises boot loader means adapted to insert a boot into the path of the advancing third layer draped plate.

30. The apparatus of claim 29 wherein said boot loader means comprises:
 (a) turret means having a plurality of slotlike cavities each being adapted to accept and retain one of said boots in a aspect so that it will be properly oriented to fit over said plate end when inserted, at least one of said cavities being oriented so that it is substantially coplanar with said inserted plate and substantially perpendicular to path of said plates as they are inserted; and
 (b) boot pusher means adapted to engage an end of said boot and push it into the path of said plate.

31. The apparatus of claim 30 wherein said boot loader further comprises boot check means to establish that the boot is properly oriented within its slotlike cavity prior to its being engaged by said boot pusher means, and further being adapted to indicate a malfunction to said control means should said boot not be so oriented.

32. The invention of claim 31 wherein said plate loader means further comprises:
 (a) reciprocating plate gripper means having jaw means to receive said boot from said boot pusher means and hold said boot in a proper position to fit over said lower edge when it contacts said boot, said gripper means further being adapted first to grasp the lower end of said plate and pull said plate over said hollow portion of said die fixture and then release it; and
 (b) tamping means adapted to engage said released plate and press it into die fixture make contact with said swatch of wrapping material within said die fixture; said third wrapping material feed means, plate loader means, boot loader means, draping means, plate gripper means and tamping means all being attached said frame relative to said turntable to form a second of said work stations.

33. An apparatus for automatically applying wrapping material to a plate for use in a storage battery, said plate having front and back surfaces, left and right sides and upper and lower edges, said wrapping material comprising a first layer of an acid-resistant thermoplastic, elastomeric material and a second layer of flexible acid-resistant material, said wrapping apparatus comprising:
 frame means further comprising a base and support legs;
 movable transport means supported by said frame means, said transport means further comprising at least one die fixture, said fixture being adapted to receive a cut swatch of said wrapping material and having means for holding said swatch while one of said plates is being deposited thereunto, said transport means acting to carry said die fixture through said apparatus;
 wrapping material input means introducing said swatch of wrapping material into said apparatus including:
 (a) first feed means to dispense said first layer of material;
 (b) second feed means to dispense said second layer of material, said first and second layers being disposed relative to each other within said swatch in such manner that said first layer will form the outermost portion of said envelope and said second layer will form an inner portion of said envelope at the conclusion of the wrapping operation; and
 (c) means for combining said first and second layers to form said swatch;
 plate loader means for inserting a plate into said die fixture after said swatch has been introduced;
 wrapping means adapted to fold said cut swatch around said plate;
 seal means adapted to bond the edges of said swatch to form said insulated envelope; and
 ejection means adapted to remove said sealed, wrapped plate from said fixture, said means for wrapping material input, plate loader wrapping, sealing and ejection being attached to said frame and disposed within said apparatus to form a coordinated set of work stations.

34. The apparatus of claim 33 wherein said first layer of wrapping material is received in and dispensed from a continuous roll in the form of a strip of material which is fed into said combination means and wherein said first feed means comprises hub means adapted to hold said roll and further comprises frictional resistance means adapted to prevent free rolling of said hubs so that said first layer of material may be accurately dispensed.

35. The apparatus according to claim 34 wherein said second layer of wrapping material is received in and dispensed from a continuous roll from which a strip of material is fed into said combination means and wherein second feed means comprises hub means adapted to hold said roll and further comprises frictional resistance means adapted to prevent free rolling of said hub means so that said second layer of material may be accurately dispensed.

36. The apparatus of claim 35 further comprising swatch gripper means adapted to grasp said combined layers and pull them out of said combining means into and through said longitudinal slots in said die fixture to said proper wrapping position within said die fixture prior to the insertion of said plate; said first and second feed means, combining means and swatch gripper means all being located on said frame along a selected portion of said turntable to form a first of said work stations.

37. The apparatus of claim 36 wherein said wrapping material input means further comprises cutting means disposed in a cutting gap between said combining means and said die fixture and cooperating with said swatch gripper means under the control of said control means to cut said combined layer to form said swatch when a preset length of said combined layers has been pulled into said die fixture by said swatch gripper means.

38. The apparatus of claim 37 wherein said first cutting means comprises a guillotine.

39. The apparatus of claim 38 wherein said combining means further comprises oscillatory carriage means within said cutting gap and adapted, when in an inner position to guide said combined first and second layers across said cutting gap into said die fixture as they are pulled out of said combining means, and further adapted, when in an outer position to support said combined layers during the operation of said cutting means so as to leave a free end for said swatch gripping means to grasp the combined layers at the start of a wrapping cycle.

40. The apparatus of claim 39 wherein said paired sheet exits from said oscillatory carriage means in a substantially horizontal direction.

41. An apparatus for automatically applying wrapping material to a plate for use in a storage battery, said plate having front and back surfaces, left and right sides and upper and lower edges, said wrapping apparatus comprising:

frame means further comprising a base and support legs;

movable transport means supported by said frame means, said transport means further comprising at least one die fixture, said fixture being adapted to receive a cut swatch of said wrapping material and having means for holding said swatch while one of said plates is being deposited thereonto, said transport means acting to carry die fixture through said apparatus;

wrapping material input means introducing said swatch of wrapping material into said apparatus;

plate loader means for inserting a plate into said die fixture after said swatch has been introduced;

wrapping means adapted to fold said cut swatch around said plate;

seal means adapted to bond the edges of said swatch to form said insulated envelope; and ejection means adapted to remove said sealed, wrapped plate from said fixture, said means for wrapping material input, plate loader wrapping, seaing and ejection being attached to said frame and disposed within said apparatus to form a coordinated set of work stations; each said die fixture having internal heating means to soften said swatch of material after it has been introduced; and temperature check means adapted to monitor the temperature of said heated die fixture after said wrapped plate has been removed by said ejection means, said temperature check means being adapted to indicate a malfunction if said temperature is outside the range of a preset softening temperature; said temperature check means being the last one of said work stations.

* * * * *